(12) United States Patent
Arai et al.

(10) Patent No.: US 10,897,655 B2
(45) Date of Patent: Jan. 19, 2021

(54) AV SERVER AND AV SERVER SYSTEM

(71) Applicant: SONY CORPORATION, Tokyo (JP)

(72) Inventors: Hideki Arai, Kanagawa (JP); Kaoru Urata, Kanagawa (JP); Mamoru Mizukami, Tokyo (JP); Yasuhiro Ichinaka, Kanagawa (JP); Akira Itou, Tokyo (JP); Kenta Abe, Kanagawa (JP); Yoshihide Fujimoto, Kanagawa (JP); Takashi Hoshi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 11 days.

(21) Appl. No.: 16/068,403

(22) PCT Filed: Apr. 11, 2017

(86) PCT No.: PCT/JP2017/014882
§ 371 (c)(1),
(2) Date: Jul. 6, 2018

(87) PCT Pub. No.: WO2017/179593
PCT Pub. Date: Oct. 19, 2017

(65) Prior Publication Data
US 2019/0028776 A1 Jan. 24, 2019

(30) Foreign Application Priority Data
Apr. 13, 2016 (JP) ................................ 2016-079939

(51) Int. Cl.
*H04N 21/6587* (2011.01)
*H04N 5/77* (2006.01)
(Continued)

(52) U.S. Cl.
CPC ......... *H04N 21/6587* (2013.01); *G06F 13/00* (2013.01); *G06F 13/10* (2013.01);
(Continued)

(58) Field of Classification Search
None
See application file for complete search history.

(56) References Cited

U.S. PATENT DOCUMENTS 6,173,329 B1 * 1/2001 Sasaki ............... H04L 29/06027
348/E5.008
6,604,158 B1 * 8/2003 Fallon ................... G06F 3/0608
709/246

(Continued)

FOREIGN PATENT DOCUMENTS

JP 2002-64772 A 2/2002
JP 2012-75071 A 4/2012
(Continued)

OTHER PUBLICATIONS

International Search Report dated Jul. 18, 2017 in PCT/JP2017/014882, 2 pages.

*Primary Examiner* — Jason K Lin
(74) *Attorney, Agent, or Firm* — Oblon, McClelland, Maier & Neustadt, L.L.P.

(57) ABSTRACT

To make it possible to easily use video data of raw data of a high frame rate input from a single-chip camera in a server system that is different from an AV server system in which an AV server itself is included.
First AV clip data is obtained by performing a compression encoding process to raw data of a high frame rate input from a single-chip camera and is written in a storage. The raw data of the high frame rate is obtained by reading the first AV clip data from the storage and processing a compression decoding process on the first AV clip data, video data of a high frame rate is obtained by performing a demosaic process on the raw data, and second AV clip data is obtained by performing a compression encoding process on the video data and is written in the storage. The second AV clip data is read from the storage and transmitted to a second AV (Continued)

server system that is different from a first AV server system in which an AV server itself is included.

10 Claims, 19 Drawing Sheets

(51) Int. Cl.
    *H04N 21/2343*     (2011.01)
    *G06F 13/00*     (2006.01)
    *G06F 13/10*     (2006.01)
    *H04N 5/765*     (2006.01)
    *H04N 9/804*     (2006.01)
    *H04N 21/231*     (2011.01)
    *H04N 21/643*     (2011.01)

(52) U.S. Cl.
    CPC ............... *H04N 5/765* (2013.01); *H04N 5/77* (2013.01); *H04N 9/8042* (2013.01); *H04N 21/231* (2013.01); *H04N 21/2343* (2013.01); *H04N 21/234381* (2013.01); *H04N 21/64322* (2013.01)

(56) References Cited

U.S. PATENT DOCUMENTS

| | | | | |
|---|---|---|---|---|
| 2001/0010541 | A1* | 8/2001 | Fernandez | G08B 13/19608 348/143 |
| 2002/0021708 | A1* | 2/2002 | Ishiai | H04L 29/06027 370/420 |
| 2005/0076134 | A1* | 4/2005 | Bialik | H04N 7/17336 709/230 |
| 2010/0157090 | A1 | 6/2010 | Kobayashi et al. | |
| 2011/0096184 | A1 | 4/2011 | Shioya | |
| 2013/0294526 | A1* | 11/2013 | Thornberry | H04N 21/44004 375/240.25 |
| 2014/0146185 | A1* | 5/2014 | Kannermark | H04N 17/002 348/187 |
| 2014/0281016 | A1* | 9/2014 | Kennedy | H04L 65/4084 709/234 |
| 2015/0365644 | A1* | 12/2015 | Kawakami | H04N 19/172 348/231.1 |
| 2016/0021405 | A1* | 1/2016 | Kasatani | H04N 19/107 725/116 |
| 2016/0112722 | A1* | 4/2016 | Rowny | H04N 19/119 348/231.2 |
| 2016/0191895 | A1* | 6/2016 | Yun | H04N 13/194 348/43 |
| 2016/0336043 | A1* | 11/2016 | Janszen | G11B 27/02 |
| 2017/0171588 | A1* | 6/2017 | Phillips | H04N 21/2393 |
| 2017/0278543 | A1* | 9/2017 | Owen | H04N 21/2343 |

FOREIGN PATENT DOCUMENTS

JP         2012-95351 A     5/2012
WO     WO 2009/005034 A1     1/2009

* cited by examiner

US 10,897,655 B2

AV SERVER AND AV SERVER SYSTEM

TECHNICAL FIELD

The present technology relates to an AV server and an AV server system, and particularly relates to an AV server system or the like in which a plurality of AV servers are connected via a network.

BACKGROUND ART

For example, Patent Literature 1 describes a technology that increases the number of IO ports of an AV server. Here, the number of IO ports is increased by separating an AV storage unit from input-output devices and increasing only the number of input-output devices.

CITATION LIST

Patent Literature

Patent Literature 1: JP 2005-063122A

DISCLOSURE OF INVENTION

Technical Problem

An objective of the present technology is to make it possible to easily use video data of raw data of a high frame rate input from a single-chip camera in a server system that is different from an AV server system in which an AV server itself is included.

Solution to Problem

A concept of the present technology is an AV server including: a first processing unit configured to obtain first AV clip data by performing a compression encoding process on raw data of a high frame rate input from a single-chip camera and write the first AV clip data in a storage; a second processing unit configured to obtain the raw data of the high frame rate by reading the first AV clip data from the storage and performing a compression decoding process on the first AV clip data, obtain video data of a high frame rate by performing a demosaic process on the raw data of the high frame rate, obtain second AV clip data by performing a compression encoding process on the video data of the high frame rate, and write the second AV clip data in the storage; and a third processing unit configured to read the second AV clip data from the storage and transmit the second AV clip data to a second AV server system that is different from a first AV server system in which the AV server itself is included.

According to the present technology, a first processing unit obtains first AV clip data by performing a compression encoding process on raw data of a high frame rate input from a single-chip camera and writes the first AV clip data in a storage, and a second processing unit obtains the raw data of the high frame rate by reading the first AV clip data from the storage and performing a compression decoding process on the first AV clip data, obtains video data of a high frame rate by performing a demosaic process on the raw data of the high frame rate, obtains second AV clip data by performing a compression encoding process on the video data of the high frame rate, and writes the second AV clip data in the storage.

The second AV clip data is read from the storage and the second AV clip data is transmitted to the second AV server system that is different from the first AV server system in which the AV server itself is included by the third processing unit. For example, the process performed by the first processing unit and the processes performed by the second processing unit and the third processing unit may be performed in parallel. In this case, the second AV clip data corresponding to the raw data of the high frame rate input from the single-chip camera can be immediately transmitted to the second AV server system.

For example, the third processing unit may synchronously transmit the second AV clip data to the second AV server system. In addition, in this case, the second processing unit may transmit the AV clip data to the second AV server system on a basis of an FTP file transfer protocol.

In addition, for example, the second processing unit may read and processes a range defined with an IN point and an OUT point from the first AV clip data written in the storage. In addition, in this case, the IN point and the OUT point may be instructed by a client controller included in the first AV server system or instructed by the second AV server system via the client controller included in the first AV server system.

In addition, for example, as the IN point and the OUT point, the second processing unit may use an IN point and an OUT point of an output request of the first AV clip data within the first AV server system. In addition, for example, as the IN point and the OUT point, the second processing unit may use an IN point and an OUT point which are obtained by shifting an IN point and an OUT point of an output request of the first AV clip data within the first AV server system by a predetermined amount such that a reading range is widened.

In the present technology described above, the video data is obtained by decoding compression encoded data of the raw data written in the storage and performing the demosaic process thereto, and the compression encoded data of the video data is transmitted to the second AV server system. Thus, in the other AV server system (the second AV server system), the video data of the raw data of the high frame rate input from the single-chip camera can be easily used even if it is difficult to handle the raw data.

Note that, according to the present technology, for example, the third processing unit may read the first AV clip data from the storage and transmit the first AV clip data to the second AV server system, selectively. In this case, since the compression encoded data of the raw data is transmitted to the other AV server system (the second AV server system), in a case in which the other AV server system can handle the raw data, image processing can be performed using the raw data.

In addition, another concept of the present technology is an AV server system including: a plurality of AV servers, each of which is configured to have an Internet Protocol (IP) input-output port for connecting to another AV server that is independent from an input-output port to an outside of the system; a client controller configured to control the plurality of AV servers; a manager configured to store information relevant to AV clip data recorded in the plurality of AV servers and AV clip data input to the plurality of AV servers; and a frame synchronization unit configured to perform frame synchronization between the plurality of AV servers. The plurality of AV servers include at least a predetermined AV server to which raw data of a high frame rate is input from a single-chip camera, and the predetermined AV server includes a first processing unit configured to obtain first AV clip data by performing a compression encoding process on the raw data of the high frame rate and write the first AV clip data in a storage; a second processing unit configured to obtain the raw data of the high frame rate by reading the first AV clip data from the storage and performing a compression decoding process on the first AV clip data, obtain video data of a high frame rate by performing a demosaic process on the raw data of the high frame rate, obtain second AV clip data by performing a compression encoding process on the video data of the high frame rate, and write the second AV clip data in the storage; and a third processing unit configured to read the second AV clip data from the storage and transmit the second AV clip data to a second AV server system that is different from a first AV server system in which the predetermined AV server itself is included.

The AV server system in the present technology includes a plurality of AV servers, a client controller, a manager, and a frame synchronization unit. The AV server includes an IP input-output port for connecting to another AV server, which is independent from an input-output port to an outside of the system. The plurality of AV servers use IP input-output ports, and are connected to each other via an IP network (IP switch). The frame synchronization unit performs frame synchronization between the plurality of AV servers.

The AV server is controlled by the client controller. The manager stores information relevant to AV clip data recorded in the plurality of AV servers and AV clip data input into the plurality of AV servers. The client controller can recognize the content of the AV clips in each AV server on the basis of the stored information of the manager, and controls the AV servers on the basis of the recognized content.

The plurality of AV servers include at least the predetermined AV server to which the raw data of the high frame rate is input from the single-chip camera. This predetermined server is assumed to have first to third processing units. The first AV clip data is obtained by performing the compression encoding process on the raw data of the high frame rate and the first AV clip data is written in the storage by the first processing unit.

The raw data of the high frame rate is obtained by reading the first AV clip data from the storage and performing the compression decoding process to the first AV clip data and the video data of the high frame rate is obtained by performing the demosaic process to the raw data of the high frame rate by the second processing unit. In addition, the second AV clip data is obtained by performing the compression encoding process to the video data of the high frame rate, and the second AV clip data is written in the storage by the second processing unit.

The second AV clip data is read from the storage and the second AV clip data is transmitted to the second AV server system that is different from the first AV server system in which the AV server itself is included by the third processing unit.

In the present technology described above, the plurality of AV servers are connected by the IP network, and the number of IO ports and a storage amount are increased easily. Also, the predetermined AV server obtains the video data by decoding compression encoded data of the raw data written in the storage and then performing the demosaic process thereto and transmits the compression encoded data of the video data to the second AV server system. Thus, in the other AV server system (the second AV server system), the video data of the raw data of the high frame rate input from the single-chip camera can be easily used even if it is difficult to handle the raw data.

Advantageous Effects of Invention

According to the present technology, it is possible to make it easy to use video data of raw data of a high frame rate input from a single-chip camera in another server system that is different from an AV server system in which an AV server itself is included. Note that the effects described in the present specification are just examples and are not limitative, and there may be additional effects.

MODE(S) FOR CARRYING OUT THE INVENTION

In the following, a mode for carrying out the invention (in the following, "embodiment") will be described. Note that the description will be made in the following order.
1. First Embodiment
2. Second Embodiment
3. Variant example 1. First Embodiment

[Configuration Example of AV Server System]

Figure 1:
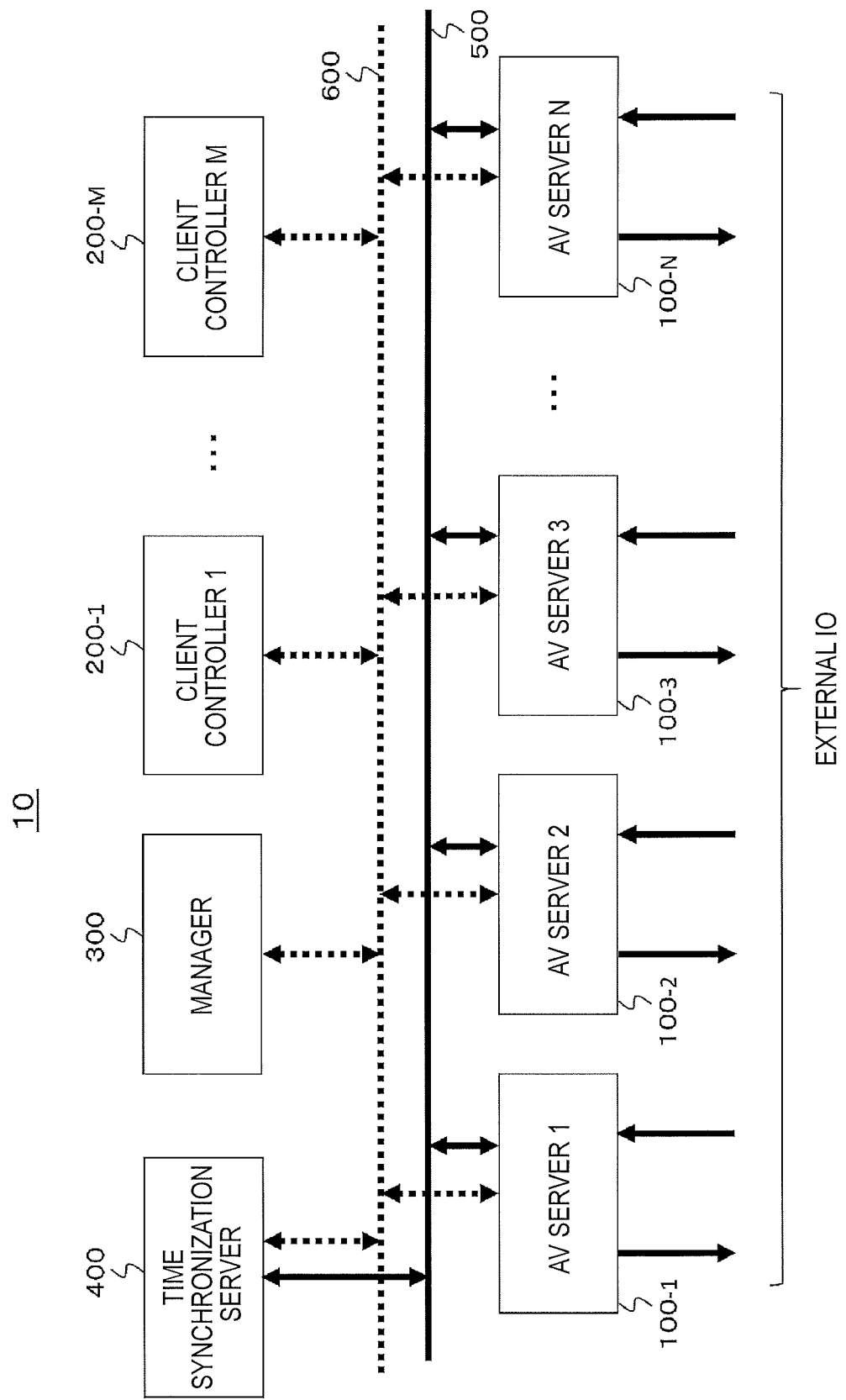
FIG. 1 is a block diagram illustrating a configuration example of an AV server system as a first embodiment.

FIG. 1 illustrates a configuration example of an AV server system 10 as a first embodiment. This AV server system 10 includes N (N is more than one) AV servers 100-1, 100-2, . . . , 100-N, M client controllers 200-1, 200-2, . . . , 200-M, a manager 300, and a time synchronization server 400. Note that M is the same as N normally, but may be different from N.

The AV servers 100-1, 100-2, . . . , 100-N include an input-output port (external IO) to the outside of the system, and includes an Internet Protocol (IP) input-output port for connecting to another AV server. The AV servers 100-1, 100-2, . . . , 100-N are connected to a dedicated IP network (hereinafter, referred to as an "inter-server network" as appropriate) 500 by utilizing the IP input-output port.

The client controllers 200-1, 200-2, . . . , 200-M control the AV servers 100-1, 100-2, . . . , 100-N on the basis of operations of an operator. Each of the client controllers 200-1, 200-2, . . . , 200-M is connected to the AV servers 100-1, 100-2, . . . , 100-N via a controller/server network 600.

The client controllers 200-1, 200-2, . . . , 200-M are used to perform a task, such as recognition of the AV clip data stored or input in each AV server, replay requests, jog/shuttle/variable-speed replay operations, and playlist editing, for example.

The manager 300 performs database management (DB management) of the AV clip data stored or input in the entire system, management of band guarantee for data transmission, and management of a utilization situation of each AV server. This manager 300 is connected to the AV servers 100-1, 100-2, . . . , 100-N, and the client controllers 200-1, 200-2, . . . , 200-M via the controller/server network 600.

The time synchronization server 400 is connected to the AV servers 100-1, 100-2, . . . , 100-N, and the client controllers 200-1, 200-2, . . . , 200-M, via the controller/server network 600. Also, the time synchronization server 400 is connected to the AV servers 100-1, 100-2, . . . , 100-N, via the inter-server network 500.

The time synchronization server 400 synchronizes the times of the AV servers 100-1, 100-2, . . . , 100-N within a predetermined error range, by operating as a master according to IEEE 1588, JP 2010-190653A, or JP 2010-197320A. In this meaning, the time synchronization server 400 configures a frame synchronization unit that performs frame synchronization of each AV server.

Note that the frame synchronization of each AV server can be performed also by using a house sync supplied to a location where each AV server is installed. The house sync is a frame signal that is supplied to everywhere in a broadcast station or the like, for the purpose of causing devices in the broadcast station to achieve frame synchronization.

Also, the time synchronization server 400 measures a transmission delay amount between arbitrary nodes, by internode transmission delay measurement which is performed periodically. Considering the response of jog/shuttle, it is desirable that the internode transmission delay amount is suppressed to one frame or less. Also, the internode data transmission delay amount measurement by the time synchronization server 400 is unnecessary, if the system is built under a premise that the internode transmission delay amount is suppressed to one frame or less. Also, if the internode data transmission delay amount measurement is unnecessary as described above, and additionally the frame synchronization of each AV server is performed by the input of the house sync, the time synchronization server 400 is unnecessary.

Data transmission is mainly performed through the inter-server network 500 to which the AV servers 100-1, 100-2, . . . , 100-N are connected, and command transmission, information transmission of the AV clip data stored or input in each AV server, and the like are performed through the controller/server network 600 to which the AV servers 100-1, 100-2, . . . , 100-N, the client controllers 200-1, 200-2, . . . , 200-M, and the manager 300 are connected.

Figure 2:
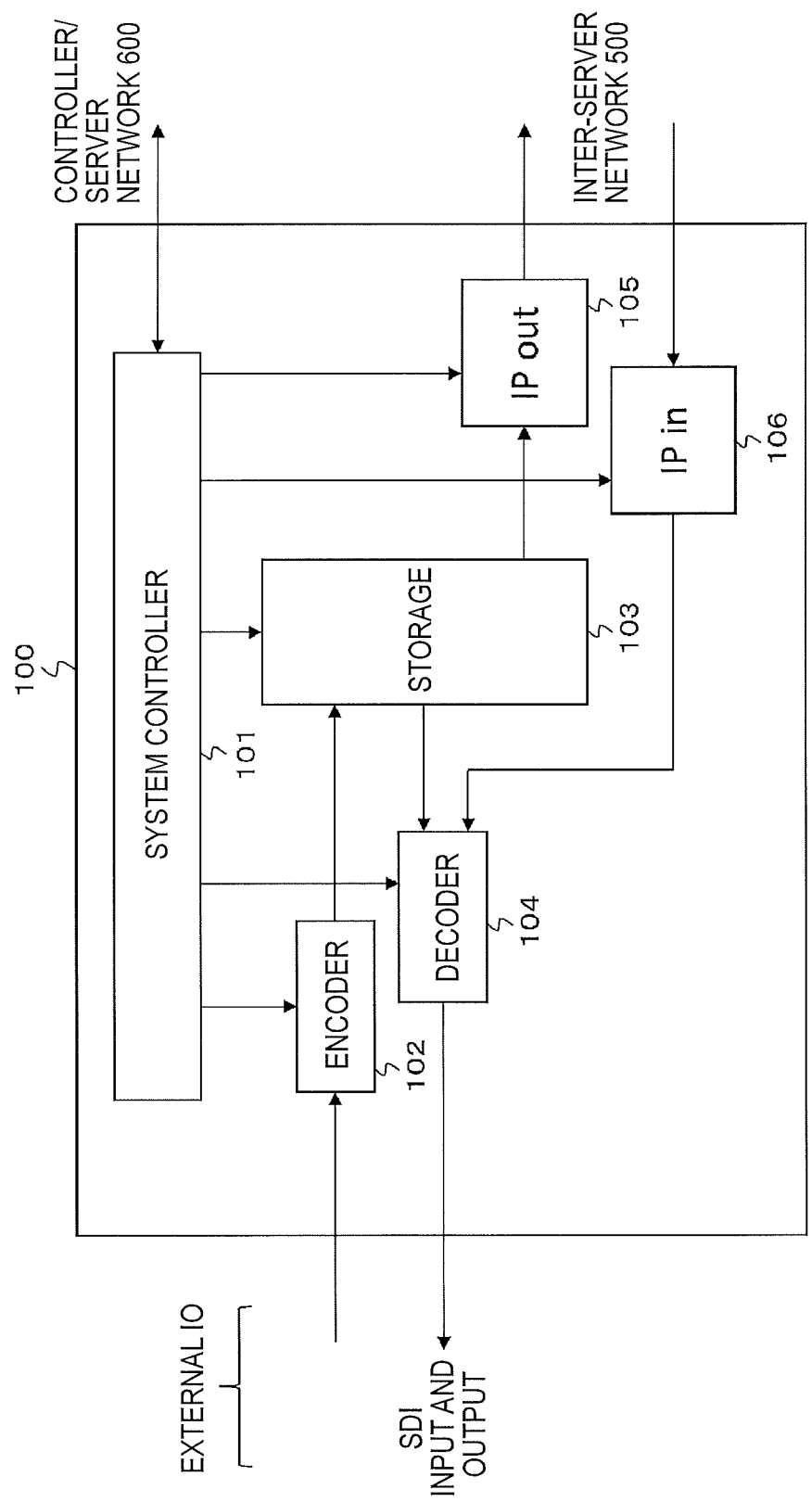
FIG. 2 is a block diagram illustrating a configuration example of an AV server.

FIG. 2 illustrates a configuration example of an AV server 100 that can be used as the AV servers 100-1, 100-2, . . . , 100-N. This AV server 100 includes an input-output IO (external IO) to the outside of the AV server system 10. The illustrated example illustrates only SDI input/output as the external IO, but IP input and output, HDMI input and output, or other various 10s may coexist. Note that "HDMI" is a registered trademark.

Also, the AV server 100 includes a system controller 101, an encoder 102, a storage 103, a decoder 104, an IP output unit 105, and an IP input unit 106. The system controller 101 controls the operation of each unit of the AV server 100. This system controller 101 is connected to the controller/server network 600.

The IP output unit 105 configures an IP output port for connecting to the inter-server network 500. The IP input unit 106 configures an IP input port for connecting to the inter-server network 500. The encoder 102 generates compressed AV clip data by performing an encoding process with a predetermined codec to the AV clip data input into the external IO. The storage 103 stores the compressed AV clip data obtained by the encoder 102. The decoder 104 generates uncompressed AV clip data by performing a decoding process to the compressed AV clip data read out from the storage 103 or input into the IP input unit 106 from another AV server, and outputs the uncompressed AV clip data to the external IO.

Figure 3:
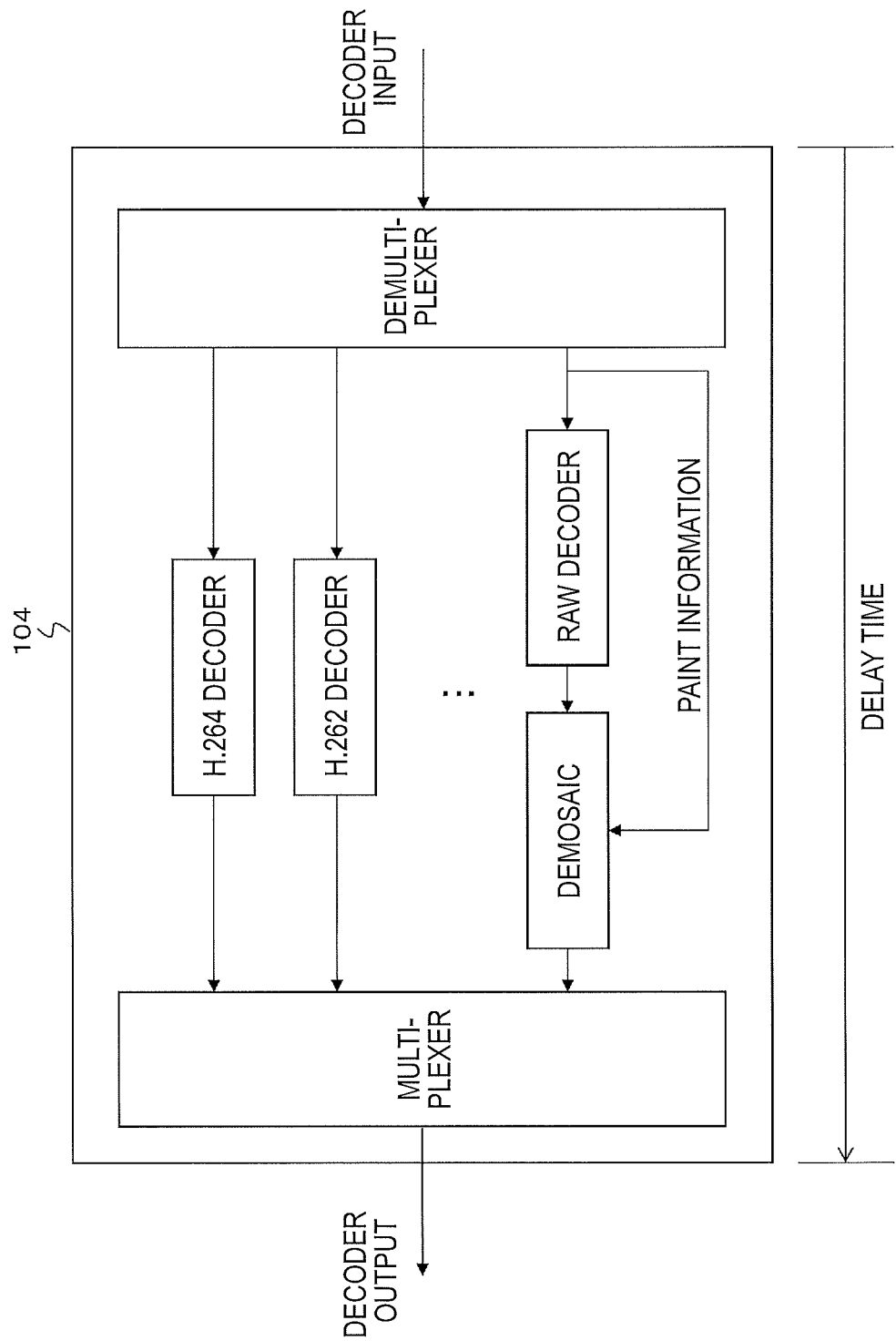
FIG. 3 is a block diagram illustrating a configuration example of a decoder.

FIG. 3 illustrates a configuration example of the decoder 104. The decoder 104 includes a plurality of types of decoders, such as an H.264 decoder and an H.262 decoder, in order to enable decoding of various codecs. Note that decoding of compressed raw data obtained by compressing raw data obtained by capturing an image by a single-chip camera is also enabled. The utilized decoder is selected by a demultiplexer and a multiplexer. In decoding of the compressed raw data, a demosaic process is performed to the data after decoding, and is set as a decoder output of normal video data. Note that, at the time of the demosaic process, a process such as gamma correction and white balance adjustment is performed by paint information appended to the compressed raw data. Although detailed description is omitted, the encoder 102 includes a plurality of types of encoders, similarly to the decoder 104.

The operation of the single component will be described. The AV clip data input into the external IO is supplied to the encoder 102. In the encoder 102, the encoding process is performed to compress the AV clip data, in order to generate the compressed AV clip data. This compressed AV clip data is stored in the storage 103.

Also, the compressed AV clip data stored in the storage 103 is read out from the storage 103 in accordance with a replay request, and is supplied to the decoder 104. In the decoder 104, the decoding process corresponding to the codec is performed to decompress the compressed AV clip data, in order to generate the AV clip data. This AV clip data is output from the external IO. In a jog/shuttle of a 60P system, the AV clip data of 60 frames per one second is subjected to a process such as decimation according to a commanded speed at the time of readout from the storage 103 for example, and is output from the external IO.

The operation (file sharing operation) with another AV server will be described. The compressed AV clip data stored in the storage 103 is read out from the storage 103 in accordance with a replay request from another AV server, and is output to the inter-server network 500 from the IP output unit (IP output port) 105, and is transmitted to the other AV server. In the jog/shuttle of the 60P system, the AV clip data of 60 frames per one second is subjected to the process such as the decimation according to the commanded speed at the time of the readout from the storage 103, and is transmitted to the other AV server.

Also, the compressed AV clip data input into the IP input unit (IP input port) 106 from another AV server via the inter-server network 500 is supplied to the decoder 104. In the jog/shuttle of the 60P system, the AV clip data of 60 frames per one second is subjected to the process such as the decimation according to the commanded speed, and is transmitted from another AV server. In the decoder 104, the decoding process corresponding to the codec is performed to decompress the compressed AV clip data, in order to generate the AV clip data. This AV clip data is output to the external IO.

Figure 4:
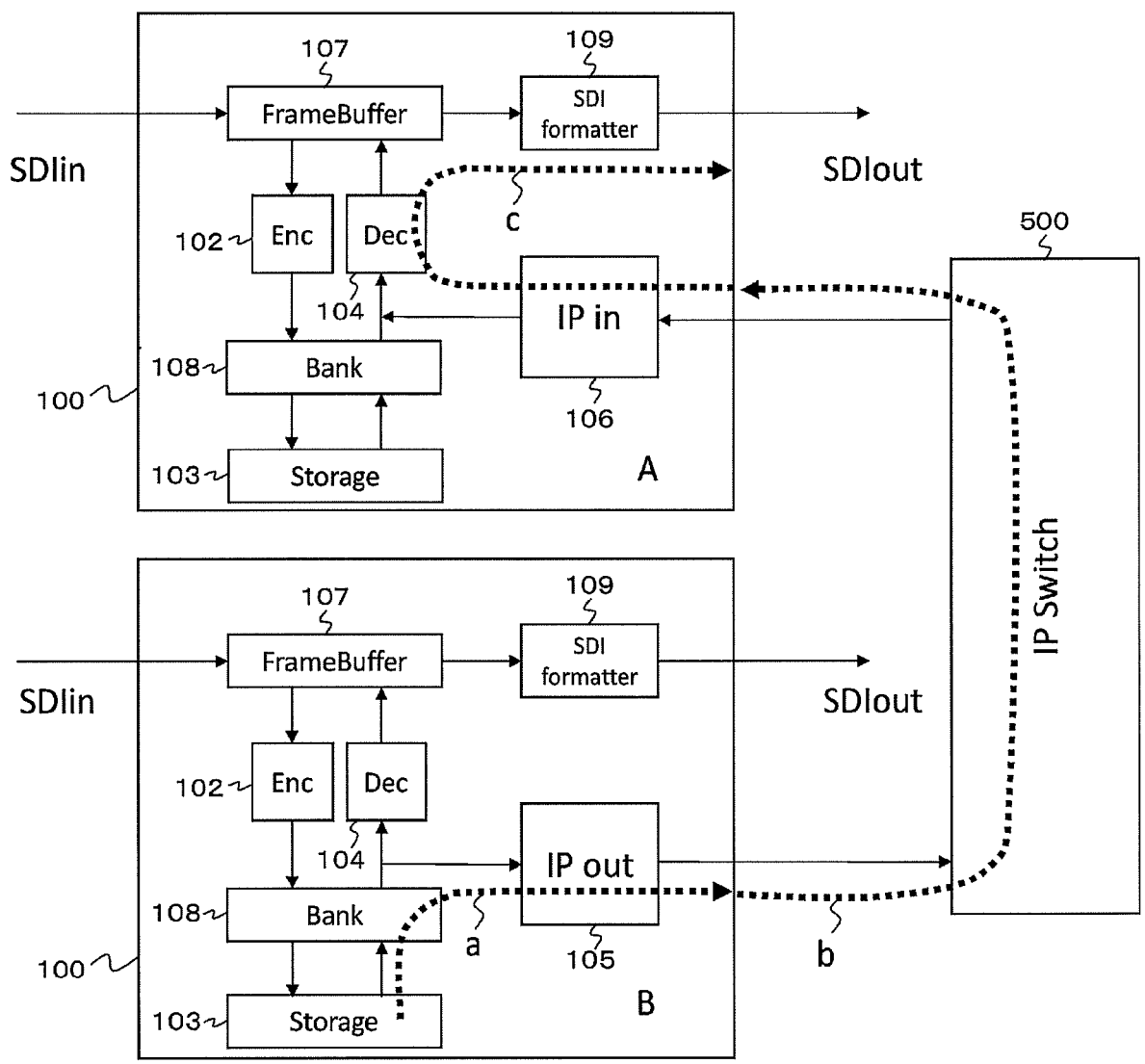
FIG. 4 is a diagram for describing a data flow in a case in which data is transmitted between AV servers.

FIG. 4 illustrates a data flow with a dashed line in a case in which data is transmitted from the AV server 100 indicated by "B" to the AV server 100 indicated by "A". Although not illustrated in the configuration example of the AV server 100 illustrated in FIG. 2, a frame buffer 107 exists at the prior stage of the encoder 102 and the subsequent stage of the decoder 104, that is, between the external IO, and the encoder 102 and the decoder 104, actually. Also, a bank 108 exists between the storage 103, and the encoder 102 and the decoder 104. Also, an output interface for outputting the AV clip data in a predetermined interface format, which is a SDI formatter 109 in the illustrated example, exists at the subsequent stage of the frame buffer 107.

In the operation of the single component, both of the AV servers 100 indicated by "A" and "B" perform the operation below. At the time of storage, the AV clip data is input into SDIin, and is compressed by the encoder 102 via the frame buffer 107, and is stored in the storage 103 via the bank 108. At the time of replay, the data is read out to the bank 108 from the storage 103, and is decompressed by the decoder 104, and thereafter is output to SDIout via the frame buffer 107. Note that urgent replay operation is returned by the bank 108, or is returned by the frame buffer 107, so that what is called "tottedashi (replay without editing)" is performed.

At the time of file share replay, the compressed AV clip data read out from the storage 103 of the AV server 100 indicated by "B" is read out to the bank 108, and is output to the inter-server network (IP switch) 500 through the IP output unit (IP output port) 105. Then, the compressed AV clip data is input into the IP input unit (IP input port) 106 of the AV server 100 indicated by "A" from the inter-server network (IP switch) 500, and is decompressed by the decoder 104, and thereafter is output to SDIout via the frame buffer 107. It is not different from the above replay in the operation of the single component, except for the inter-server network 500 interposed. Thus, the operation of jog/shuttle/variable-speed replay is basically not different from the operation of the single component, and the difference is only the inter-server network 500 interposed.

In the file share replay, the AV clip data passes through a route in the order of a, b, c. The transmission delay amounts of a and c are predetermined values, whereas the transmission delay amount of b is a different value depending on the configuration of the inter-server network 500, the distance on the network between the AV servers 100 indicated by "A" and "B," and the traffic on the inter-server network in some cases.

The time synchronization server 400 measures the transmission delay amount between the nodes periodically, and thereby it is possible to find how much time before the readout of the compressed clip data from the storage 103 must be started in order to output the data at a predetermined time, and informs that it is impossible to output the compressed clip data at a predetermined time in some cases. Note that, if the system configuration is such that the transmission delay amount between the nodes is set in advance within a predetermined value, for example within one frame, as described above, the transmission delay amount measurement by the time synchronization server 400 is unnecessary.

As described above, the data transmission delay relevant to the file share replay straddling between arbitrary nodes is decided by the predetermined transmission delay amounts of the routes a and c in the AV server 100 and the transmission delay amount of the route b measured by the time synchronization server 400, in order to set the readout time from the storage 103 for outputting the AV clip data to the outside of the system at a correct time.

The AV server 100 supports various picture frames and various codecs. In this embodiment, the transmission delay amount of the route c is set to a constant value for all supported picture frames and codecs. For example, the decoder 104 is configured in such a manner that the delay time (refer to FIG. 3) from the decoder input to the decoder output is constant for all the codecs. In the case of a codec in which the decoding process is completed in a short time, this is achieved by delaying the output.

Also, the data route for outputting, not the compressed AV clip data stored in the storage 103 of the AV server 100, but the compressed AV clip data being recorded in the storage at the present moment, from another AV server by file sharing is a route of SDIin→the frame buffer 107→the encoder 102→the bank 108→the IP output unit (IP output port) 105→the inter-server network (IP switch) 500, in the AV server 100 indicated by "B" of FIG. 4.

Figure 5:
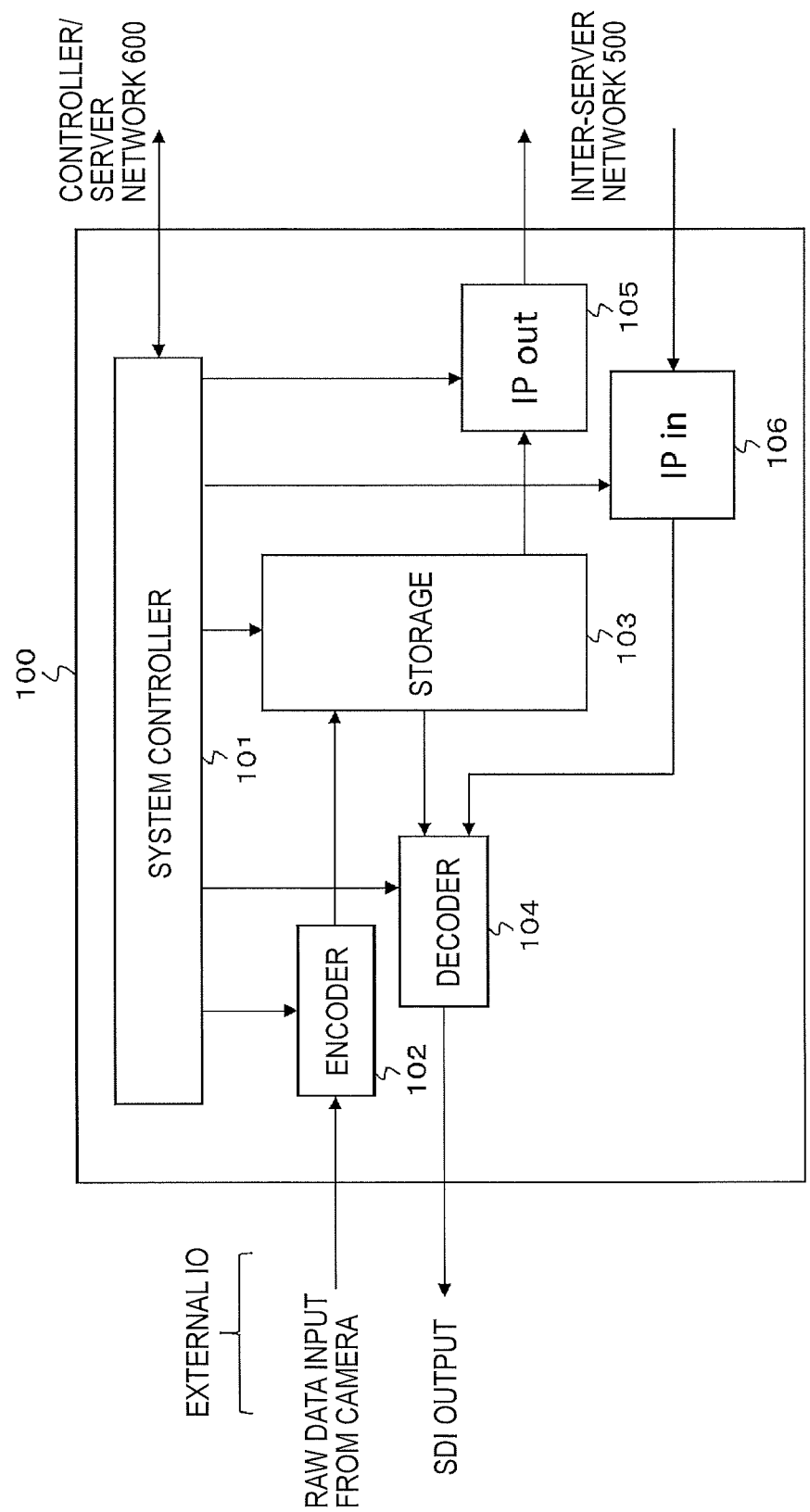
FIG. 5 is a block diagram illustrating a special configuration example of an AV server.

FIG. 5 illustrates a special configuration example of the AV server 100. In this FIG. 5, the parts corresponding to FIG. 2 are denoted with the same reference signs, and their detailed description will be omitted as appropriate. This AV server 100 is a baseband processor unit (BPU) connected to the subsequent stage of a system camera. The BPU is normally used to convert the raw data obtained by the single-chip camera to the normal video data by performing demosaic to the raw data, and to perform slow replay by storing high-speed captured image data obtained by a high frame rate (HFR) camera. Note that return video input for system camera operation is omitted in the drawing. Note that, if a three-chip camera is connected, the AV clip data input from the outside is normal video data, and therefore the operation is the same as that of the AV server 100 of FIG. 2.

When the raw data obtained by the single-chip camera is input, this raw data is subjected to the encoding process by the encoder 102 to be compressed, and thereafter is stored (recorded) in the storage 103 as the compressed AV clip data. Without the demosaic, the raw data does not become normal video data, and therefore the decoder 104 performs the demosaic in addition to the decompression by the decoding process. This decoder 104 in the AV server 100 as the BPU of FIG. 5 is configured similarly to the decoder 104 in the AV server 100 of FIG. 2 (refer to FIG. 3).

The single-chip camera is used in filming movies or dramas in many cases. In that case, a specialist of picture creation such as coloring takes time to create the video signal at the same time of demosaic, and thus metadata relevant to the demosaic is not needed necessarily. However, automatic demosaic is performed in this embodiment, and thus appropriate paint information (metadata) is necessary in addition to the raw data. Thus, the raw data input from the camera is compressed by the encoder 102, and thereafter the paint information is appended to the compressed raw data and is stored in the storage 103. Note that this paint information is the information for performing a process such as gamma correction and white balance adjustment, and is supplied from the camera.

When the compressed raw data is read out from the storage 103, the paint information appended thereto is also read out simultaneously, and in the case of the operation of single component, is sent to the decoder 104 of itself, and in the case of the share replay operation, is sent to the decoder 104 of another AV server 100 via the inter-server network 500. Then, the decoder 104 performs the demosaic in addition to the decompression by the decoding process, and further performs a process such as gamma correction and white balance adjustment on the basis of the paint information.

Figure 6:
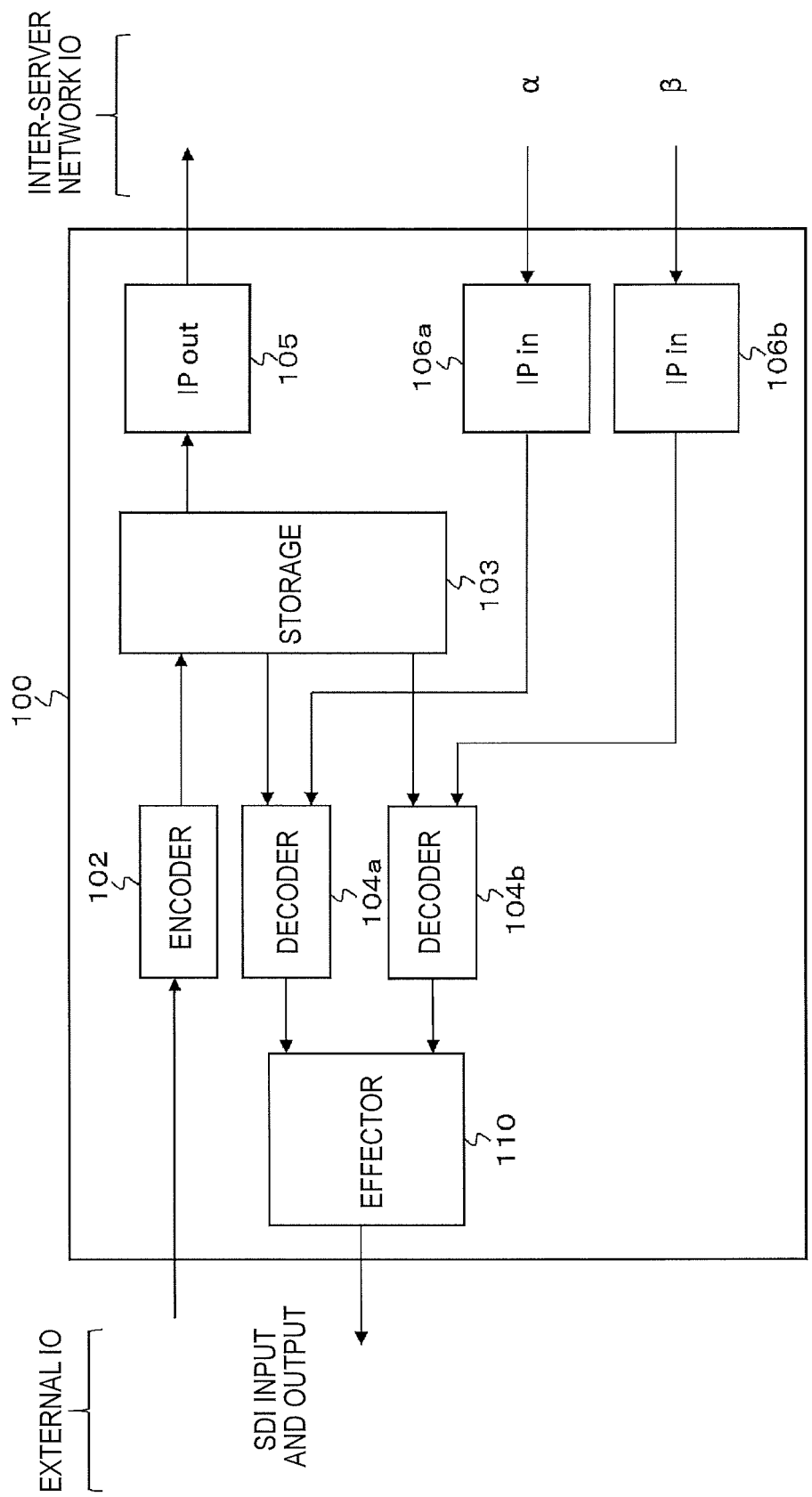
FIG. 6 is a block diagram illustrating a configuration example of an AV server for performing clip connection at the time of playlist replay.

FIG. 6 illustrates a configuration example of the AV server 100 for performing clip connection at the time of playlist replay. In this FIG. 6, the parts corresponding to FIG. 2 are denoted with the same reference signs, and their detailed description will be omitted. In the illustrated example, two decoders 104a, 104b, two IP input units (IP input ports) 106a, 106b, and an effector 110 are included. Note that, in this FIG. 6, illustration of the system controller 101 is omitted.

The playlist replay is the replay that performs replay in accordance with a playlist that describes an edit procedure for performing cut editing and applying effect. It is necessary to switch the AV clip data by combining simple replays to appropriately perform switching or apply effect on the AV server 100 that performs external output.

At a clip connection, the compressed AV clip data before and after the connection is read out from the storage 103 of a predetermined AV server 100 that stores the compressed AV clip data at appropriate timings respectively, and both are input into the AV server 100 whose output port is designated via the inter-server network 500, and are subjected to switching/effect application by the effector 110 after the decoding in the AV server 100.

In the example of FIG. 6, a configuration that performs switching from AV clip data α to AV clip data β is illustrated. Two IP input units (IP input ports) 106a, 106b are provided for the inter-server network 500, and the transmission of the inter-server network 500 is performed to input the AV clip data α, β respectively. Then, the decoders 104a, 104b perform the decoding process to the AV clip data α, β respectively, and thereafter the effector 110 performs the switching appropriately.

Note that this paint information is white balance setting information, white balance offset setting information, black setting information, flare correction setting information, gain setting information, electronic shutter operating condition setting information, slow shutter setting information, iris control setting information, slow & quick motion setting information, flicker correction setting information, gamma correction setting information, black gamma setting information, knee correction setting information, white clip setting information, detail adjustment setting information, aperture correction setting information, skin detail correction setting information, matrix correction setting information, multi-matrix correction setting information, and the like, and is supplied from the camera, and is appended to the raw data and stored in the storage 103.

"Slow Replay"

A case in which a high frame rate (HFR) camera is connected to the BPU (refer to the AV server 100 of FIG. 5) will be described. The HFR camera is a camera that is capable of capturing an image in a higher frame rate than a normal frame rate, that is, a high frame rate. For example, when the normal frame rate is 60P (capturing 60 frames per one second), the high frame rate is equal to or higher than 120P. The slow replay is enabled by reading out the frame data captured at a high speed by the HFR camera, at a normal frame rate. For example, if the data captured at 480P is read out at the rate of 60P, slow replay is performed at ⅛ speed.

Figure 7:
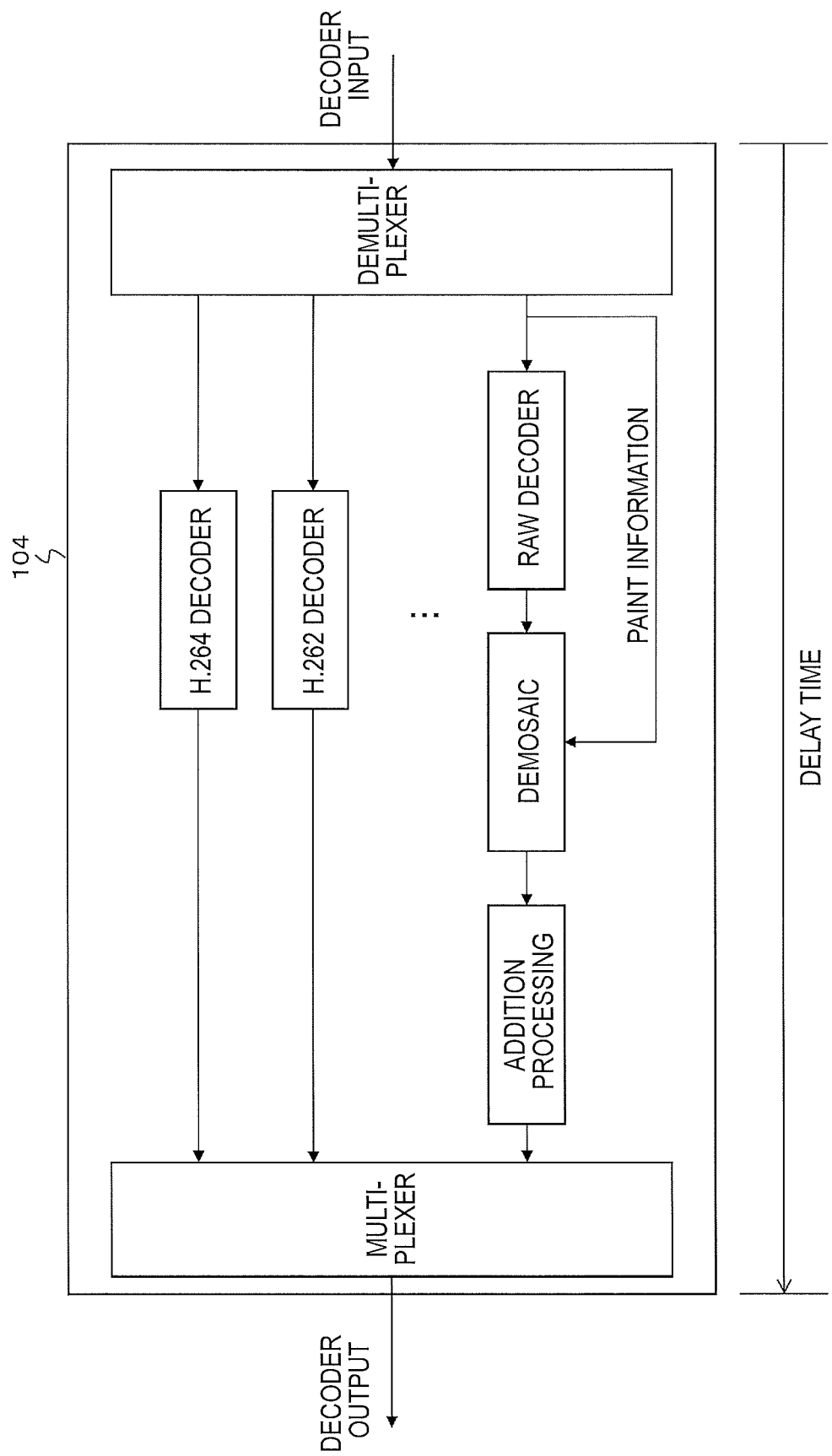
FIG. 7 is a block diagram illustrating another configuration example of a decoder.

If the data captured at n×60P is output at 60P, slow replay is performed at 1/n speed, and if consecutive k frames are added at the time of the replay, and the result is multiplied by 1/k and output at 60p, slow replay is performed at k/n speed. FIG. 7 illustrates a configuration example of the decoder 104 that includes an addition processing unit that adds consecutive k frames and multiplies the result by 1/k. In this case, slow replay is enabled at various rates with n at the time of image capturing and k at the time of replay.

There is a method that does not perform this addition process but performs decimation such as replaying and outputting one frame in every k frames to perform k/n speed replay, and in that case the load of the inter-server network becomes lighter. However, the motion of the replay output becomes smoother by sending all the consecutive frames and performing the addition process.

Figure 8:
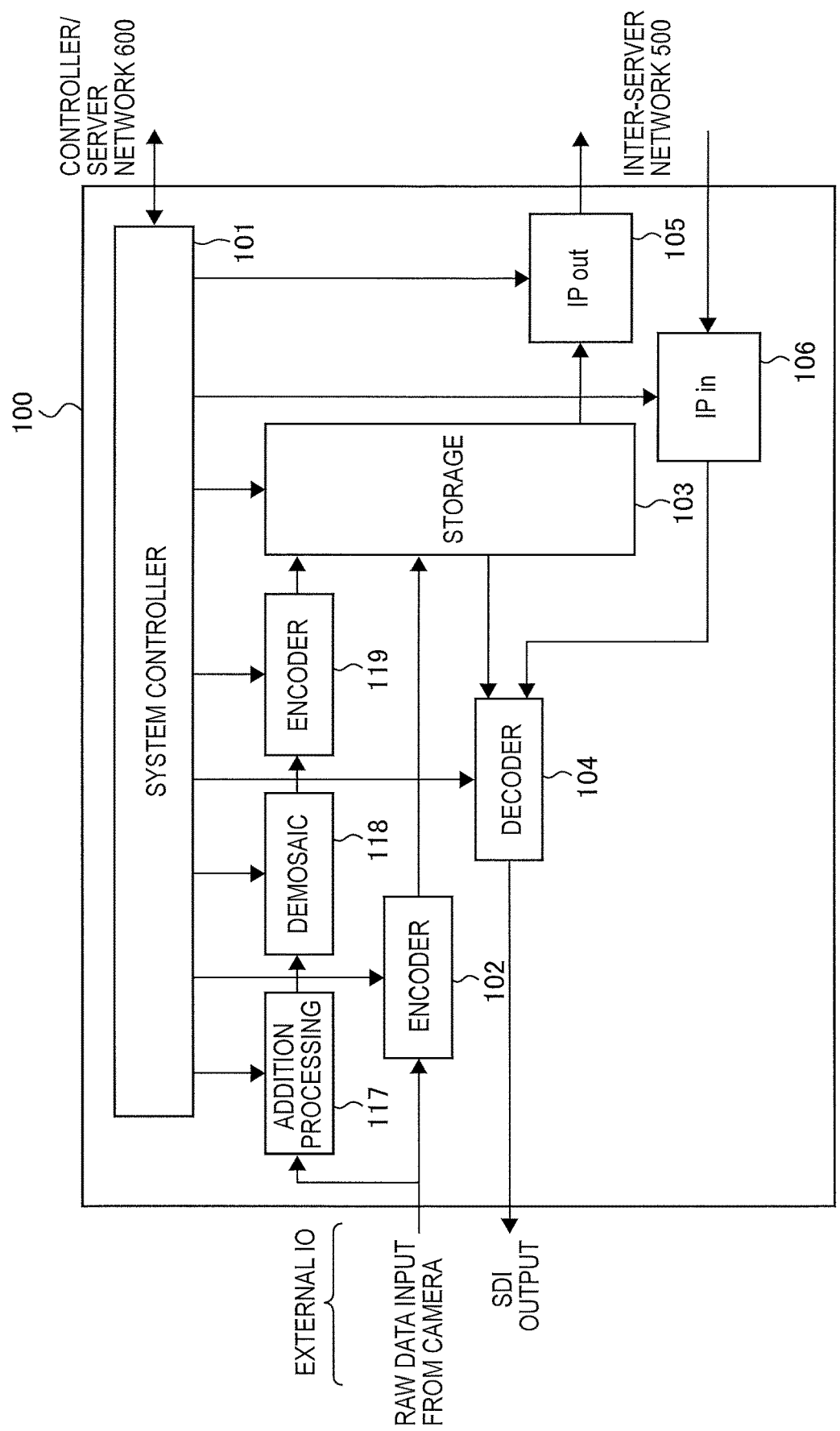
FIG. 8 is a block diagram illustrating another configuration example of an AV server.

Also, when the HFR camera captures images at a high speed, data usability is improved by recording also the data of normal frame rate. FIG. 8 illustrates a configuration example of the AV server 100 in that case. In this FIG. 8, the parts corresponding to FIG. 5 are denoted with the same reference signs, and their detailed description will be omitted as appropriate.

The encoder 102 performs the encoding process (compression encoding process) to the raw data of a high frame rate of N times speed input from the single-chip camera, in order to obtain the compressed raw data, and the paint information is appended to this compressed raw data and is stored (recorded) in the storage 103 as the compressed AV clip data (first AV clip data). By recording the raw data input from the single-chip camera, in the storage 103 without performing the demosaic process as described above, the raw data of the high frame rate of N times speed can be smoothly recorded in the storage 103, and the freedom degree of processing, such as gradation and coloring, can be ensured.

Also, an addition processing unit 117 adds consecutive N frames to the raw data of the high frame rate of N times speed input from the single-chip camera, and further the result is multiplied by 1/N in order to obtain the raw data of the normal frame rate of 1× speed. The demosaic unit 118 performs the demosaic process to the raw data of this normal frame rate, to obtain the video data (1× speed video data) of the normal frame rate.

The encoder 119 performs the encoding process (compression encoding process) to the video data of this normal frame rate in order to obtain compressed video data, and this compressed video data is stored (recorded) in the storage 103 as the compressed AV clip data (second AV clip data). Thereby, the raw data of the high frame rate, as well as the video data which looks as if captured at the normal frame rate, is stored in the storage 103. The video data of this normal frame rate is used highly frequently, and the load on the system becomes smaller by recording the video data in the storage 103 in advance.

In the case of sports video or the like, a cut is requested in many cases to perform replay at 1× speed and then to perform slow replay from a certain time point, and this is achieved by a method for switching between two compressed AV clips with synchronization, such as replaying 1× speed video data and the raw data recorded at N times speed by switching them at a certain time point. For example, this is achieved by inputting 1× speed video data as the clip data α and N times speed raw data as the clip data β in the AV server illustrated in FIG. 6 and switching them at the same image capturing time.

Note that, instead of the compressed 1× speed video data described above, it is conceived to add the consecutive N frames, multiply the result by 1/N to create 1× speed raw data, store its compressed data in the storage 103 together with the paint information, and utilizes it.

Figure 9:
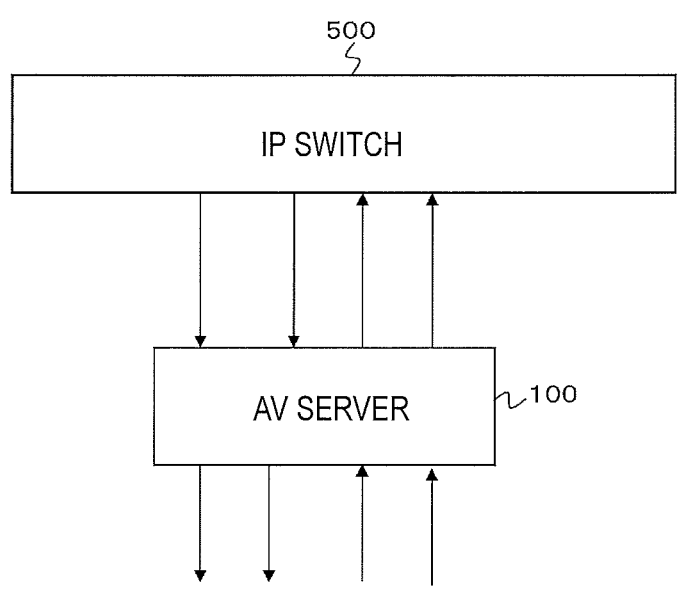
FIG. 9 is a diagram illustrating connection between an AV server and an IP switch for configuring an inter-server network.

FIG. 9 illustrates connection between the AV server 100 and the IP switch that configures the inter-server network 500. In the illustrated example, one AV server 100 is connected to the inter-server network 500 through four IO ports including two inputs and two outputs. Also, in the illustrated example, the input-output IOs to the outside of the system are four in total, including two inputs and two outputs.

Here, the AV server 100 outputs the compressed AV clip data of a predetermined number of frames at a predetermined number of frame cycles, i.e. in this embodiment one frame at one frame cycle, from one IP output port. Also, the AV server 100 processes the compressed AV clip data input into one IP input port at a predetermined number of frame cycles as the compressed AV clip data of a predetermined number of frames, i.e. in this embodiment processes the compressed AV clip data input at one frame cycle as the compressed AV clip data of one frame. Thereby, it becomes easy to manage the band in the inter-server network 500 of the AV server system 10, facilitating the implementation.

In this case, the AV server 100 processes the compressed AV clip data input during a period of one frame or less, for example a period of 0.5 frames, from a frame start time, as the compressed AV clip data of one frame. This improves the response of the jog/shuttle. Note that, in this case, the response can be improved as the period is made shorter, but the number of unreceived IP packets increases accordingly. The compressed AV clip data that is deficient due to the unreceived IP packets is reproduced by a forward error correction (FEC) process.

"Band Guarantee of Inter-Server Network" Next, band guarantee of the inter-server network 500 will be described. A situation will be considered in which, in the AV server system 10 illustrated in FIG. 1, a certain operator operates a client controller 200 (200-1, 200-2, . . . , 200-M) to output the AV clip data to the outside of the system from the corresponding AV server 100 (100-1, 100-2, . . . , 100-N).

The manager 300 has a database of information relevant to the AV clip data stored in all the AV servers 100. This information includes storage ID, clip ID, clip name, start time code, duration, video format/codec, keyword, and the like, for example.

The content of the database of the manager 300 is updated on the basis of a command from the client controller 200. The client controller 200 has a database similar to the manager 300. The manager 300 delivers the updated data to the client controller 200 each time the database of the manager 300 is updated, thereby updating the database in the client controller 200.

The operator recognizes the content of the database on the screen of a monitor (not depicted) connected to the client controller 200, and inputs a command with a keyboard, a mouse, a jog dial, or the like. In this case, when a certain clip is selected from a plurality of clips displayed on the monitor screen, a list of names associated with feature scenes in the clip is displayed. Further, when a certain name is selected from the list of names, thumbnails corresponding to the scene are displayed.

With reference to the display of the monitor screen, the operator inputs, into the client controller 200, a replay request indicating from which scene to which scene of which AV clip is output to which output port of the AV server 100 at which time. Here, the time is on a base axis of time code by the frame rate that the AV server system 10 operationally specifies.

The replay request input into the client controller 200 is transferred to the manager 300. The manager 300 makes a schedule for executing the replay request. That is, the manager 300 arranges a utilization schedule of devices in the AV server 100 that stores the AV clip data, a band utilization schedule of the inter-server network 500, and a utilization schedule of devices in the AV server 100 that has the output port, in order to output a replay output to the designated output port at a requested time. Here, the band utilization schedule and the device utilization schedule are referred to as "band booking" and "device booking" as appropriate, in the following.

The manager 300 confirms the availability of the booking arranged as described above. That is, the manager 300 confirms whether or not a necessary device is available with regard to the AV server 100, and whether or not the band is guaranteed with regard to the inter-server network 500, on the basis of the schedule arranged as described above.

The band of the inter-server network 500 is normally decided by the capability of the IP switch that forms the network. In confirming the band guarantee, the manager 300 confirms whether or not there is a band that can be used in the replay request over all moments during the data transmission period on the inter-server network 500 which is necessary for the replay request. That is, the manager 300 confirms whether or not a predetermined band amount remains, by subtracting the used band of this time from the remainder of the consumed band amount of the inter-server network 500 during the data transmission period of this time, which is scheduled before the replay request of this time.

In a case in which the inter-server network 500 and the controller/server network 600 are integrated without configuring V-LAN, it seems necessary to reduce the band that is used in the communication of the controller/server network 600. However, the data amount of the communication of the controller/server network 600 is far smaller than the data amount of the compressed AV clip data, and can be ignored.

Also, the manager 300 confirms the device availability, similarly to the confirmation of the band guarantee. That is, the manager 300 confirms whether or not the devices corresponding to the replay request of this time is available over all moments during the data transmission period. Here, the devices mean an inter-server network IO, a system external IO, a decoder, and the like.

When confirming the availability of the booking of this time over the existence of the previous booking, the manager 300 sends, to the AV server 100 storing the AV clip of replay target, a command to perform the data transfer to the AV server 100 designated as the external output port, in accordance with the booking. Thereby, data transmission is started from the AV server 100 storing the AV clip of replay target to the AV server 100 designated as the external output port.

Also, when confirming no availability of the booking of this time over the existence of the previous booking, the manager 300 announces a rejection of the replay request to the operator through the client controller 200.

Note that, in the above description, in response to the replay request from the client controller 200, the manager 300 arranges the schedule, and confirms the availability of the schedule, and sends a command to the AV server 100 in accordance with the schedule. However, the client controller 200 has the database updated in a timely manner, similarly to the manager 300 as described above, and thus the client controller 200 can arrange the schedule in response to the replay request and confirm the availability of the schedule by itself.

In that case, for example, the client controller 200 sends the schedule whose availability is confirmed finally, to the AV server 100 designated as the external output port through the manager 300. Then, in accordance with the booking, this AV server 100 sends a command to the AV server 100 storing the AV clip of the replay target, in order to perform data transfer to the AV server 100 designated as the external output port. Thereby, data transmission is started from the AV server 100 storing the AV clip of the replay target to the AV server 100 designated as the external output port.

It is conceived that a data packet is lost in some cases, in the data transmission from the AV server 100 storing the AV clip of the replay target to the AV server 100 designated as the external output port. If such a case is addressed by a retransmission request, the arranged band booking and device booking are destroyed.

If the data transmission proceeds as the booking, the transmission destination server is unable to receive the data that is expected to come. To prepare for that case, in this embodiment, the forward error correction is performed in the data transmission between the AV servers 100, so that the transmission data has sufficient redundancy and a function for reproducing the unreceived part from the received data is achieved.

The IP output units (IP output ports) 105 in FIGS. 2, 4, 5, 6, and 8 have a function for generating the redundancy for the forward error correction, and the IP input units (IP input ports) 106, 106a, 106b have a function for reproducing the data by the forward error correction if the transmitted data lacks its part.

"Playlist Creation"

Figure 10:
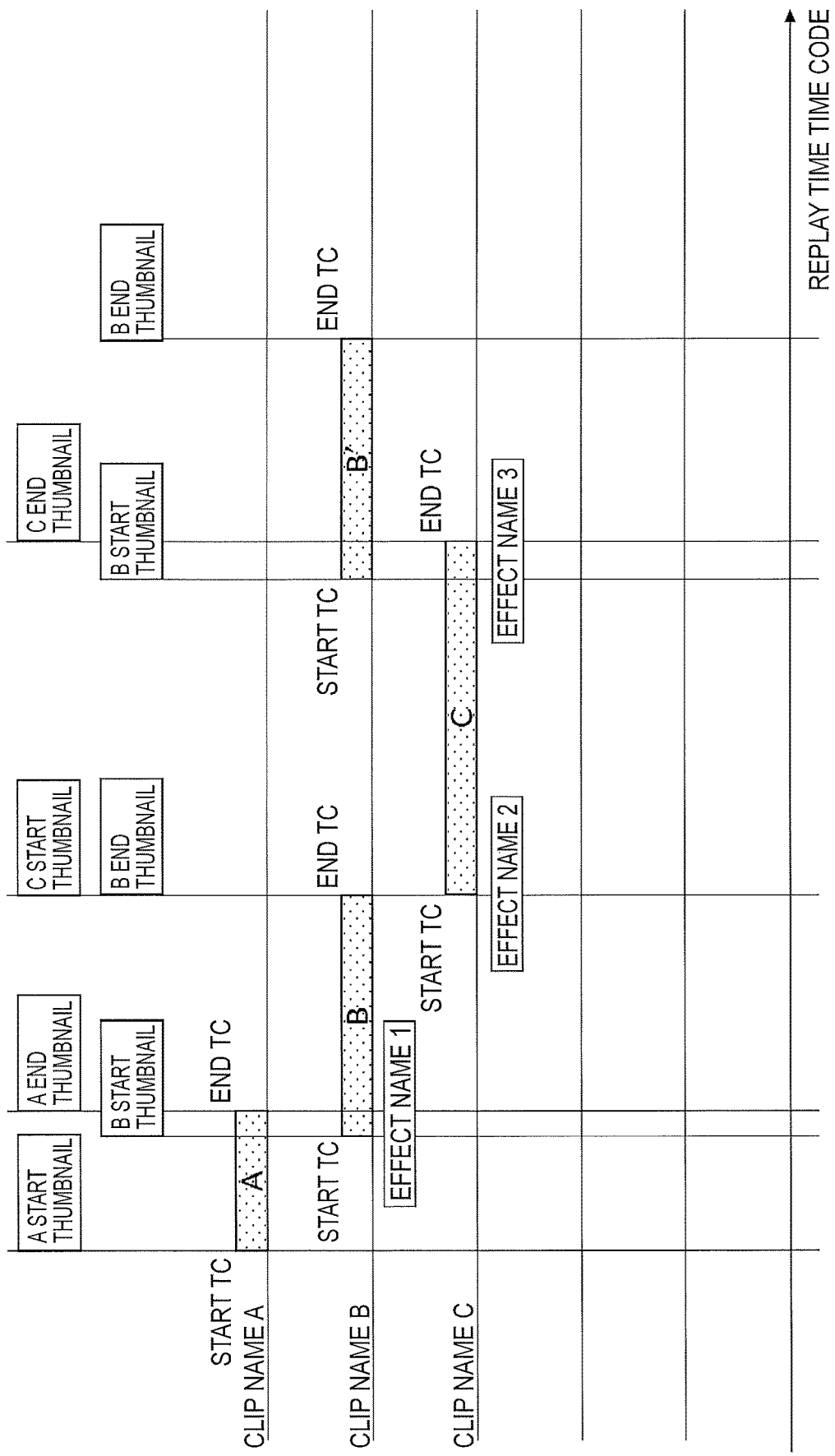
FIG. 10 is a diagram illustrating a playlist creation screen example in a client controller.

FIG. 10 illustrates a playlist creation screen example in the client controller 200. The operator creates a playlist by using the playlist creation screen, on the basis of the clip information displayed in the monitor screen. If a clip to replay is selected along a timeline indicating replay time, and a clip name is input, and a time code of the time to start of the clip is designated as a time code to replay, a screen thumbnail at the start time appears, and if a time code to end is designated, a screen thumbnail at the end time and a display indicating the replay period appear, on the timeline.

For example, in the illustrated example, a rectangle in which "A" is written, a start thumbnail, and an end thumbnail are displayed, with regard to the clip of a clip name A, as illustrated in the drawing. In the illustrated example, the designation of the clip of the clip name A is followed by the designation of the clip of a clip name B, the clip of a clip name C, and the clip of the clip name B. Note that "B'" is written in the rectangle corresponding to the second designation of the clip of the clip name B. In the illustrated example, the playlist defines a replay sequence of A→B→C→B'.

The sections in which the clips overlap temporally indicate that there is an effect during the switching of the screen, and the effect is selected by designating an effect name (in the drawing, indicated by effect names 1, 3). On the other hand, if the clips do not overlap temporally, a simple scene change is performed (in the drawing, indicated by effect name 2).

The playlist is defined in this way in the client controller 200, and its replay is requested to the manager 300. The manager 300 that has received the request makes the band booking and the device booking along the playlist, and confirms the availability. It is also conceived that not the manager 300 but the client controller 200 itself makes the band booking and the device booking for the playlist created as described above, and confirms the availability.

"Change in Direction of Input-Output Port"

Figure 11:
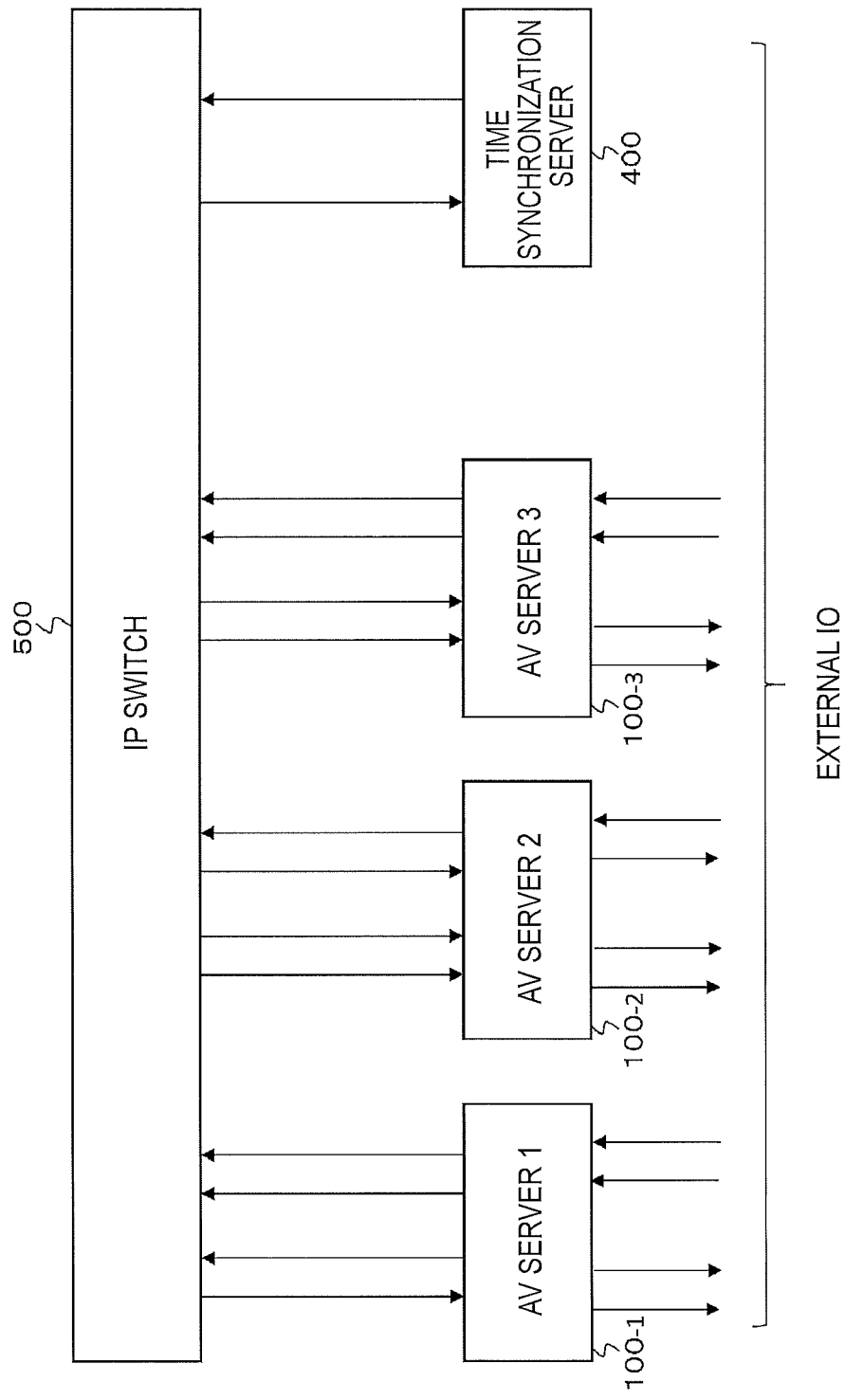
FIG. 11 is a diagram illustrating an example of dynamically changing in/out of an IO port of an AV server.

FIG. 11 illustrates an example in which the devices are made available by inverting in/out dynamically if possible, when there are insufficient IO ports to the inter-server network 500 as the utilized devices. For example, in an initial state, each of three AV servers 100-1, 100-2, and 100-3 has two inputs and two outputs as the IO ports to the inter-server network 500.

It is assumed that the replay request of this time is a request for causing the AV clip data stored in the AV server 100-1 to be output to the outside from the AV server 100-2, and during its replay period, two inter-server network output ports from the AV server 100-1 and two inter-server network input ports to the AV server 100-2 have already been booked.

In this case, if one inter-server network input port to the AV server 100-1 and one inter-server network output port from the AV server 100-2 are not booked over the replay request period, the manager 300 sets each port in the inverted direction as illustrated in the drawing, in order to enable execution of the replay request, for example.

Note that inverting an IO port to the outside of the system is also conceived. For example, in the illustrated example, the IO ports to the outside of the system are two inputs and two outputs in an initial state, and one input port of the AV server 100-2 is changed to an output port.

Note that, in the system not in operation, the input-output ports can be combined arbitrarily in the initial state.

"Playlist Replay"

In playlist replay, a replay request itself is the booking of a plurality of replay requests. In addition, the manager 300 performs scheduling for special operation such as scene change by frame break or scene change with effect. Here, a replay request that does not set the end time (end frame) is conceived as the special replay request.

In the band booking and the device booking in this case, the replay possibility is determined in consideration of the schedule of the bands and the devices, under a premise that the bands and the devices are used continuously until the replay end command comes, and if the replay is started, the bands and the devices are booked continuously until the replay end command comes. This applies to a replay request involving a temporally arbitrary command of the operator, such as jog and shuttle.

Figure 12:
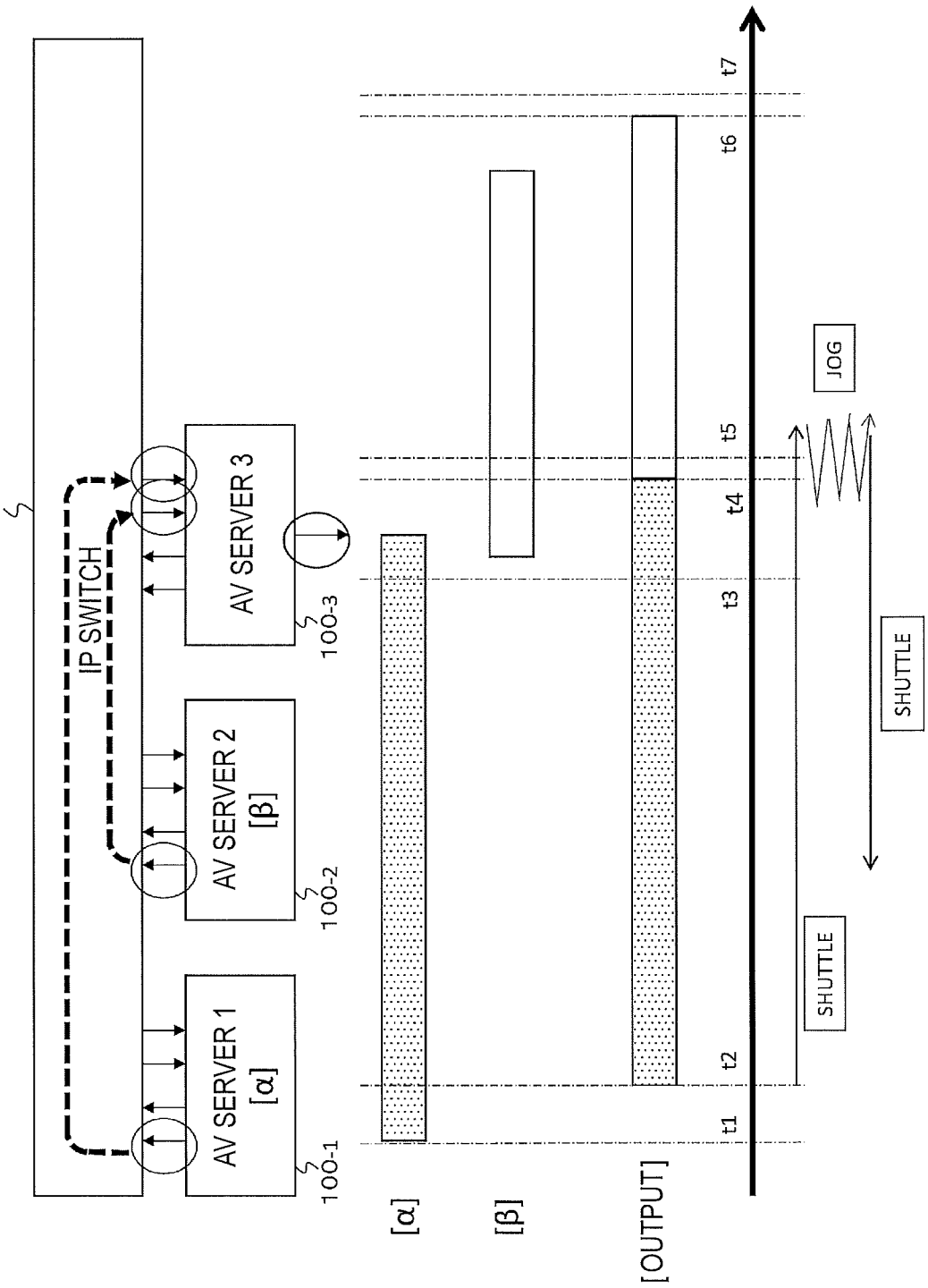
FIG. 12 is a diagram for describing an example of playlist replay.

FIG. 12 illustrates an example of playlist replay. The following device booking and band booking are performed with regard to the playlist to output the AV clip [α] stored in the storage of the AV server 100-1 to the AV server 100-3 from time t2 to time t4, and switch to the AV clip [β] stored in the storage of the AV server 100-2 at time t4, and output the AV clip [β] to time t7, for example.

That is, with regard to the device booking,
the inter-server network output port of the AV server 100-1 is booked from t1 to t5;
the inter-server network output port of the AV server 100-2 is booked from t3 to t7;
one inter-server network output port of the AV server 100-3 is booked from t1 to t5;
one inter-server network output port of the AV server 100-3 is booked from t3 to t7;
and
the output port to the outside of the AV server 100-3 is booked from t2 to t7
(in addition, necessary decoders inside the servers, etc. are booked).

Also, with regard to the band booking, the band of the inter-server network 500 for sending the compressed data of each of the AV clip [α] and the AV clip [β] is booked in an appropriate time slot.

If such booking is performed and executed, all devices and bands are made available by t7. However, if jog and shuttle are performed arbitrarily with regard to the replay along this playlist, the above booking of the devices and bands must be continued endlessly. This is because the transmission route and the data position for switching the AV clip are decided, but nothing is decided for the replayed part and the replay end.

This is because the devices and the bands are necessary endlessly to allow arbitrary motion, such as skipping by the shuttle, moving finely by the jog, and returning by the shuttle, as described in the lower portion of FIG. 12, for example.

As described above, in the AV server system 10 illustrated in FIG. 1, a plurality of AV servers 100 are connected by the IP network, and the number of IO ports and the storage amount are increased easily. Also, the inter-server network 500 between the AV servers 100 is configured with general-purpose IP switches, which are not specialized for AV system products, and thus not only acquisition is easy in future, but also the performance is expected to be improved, and a connection that can meet more advanced replay request is enabled.

2. Second Embodiment

[Configuration Example of AV Server System]

Figure 13:
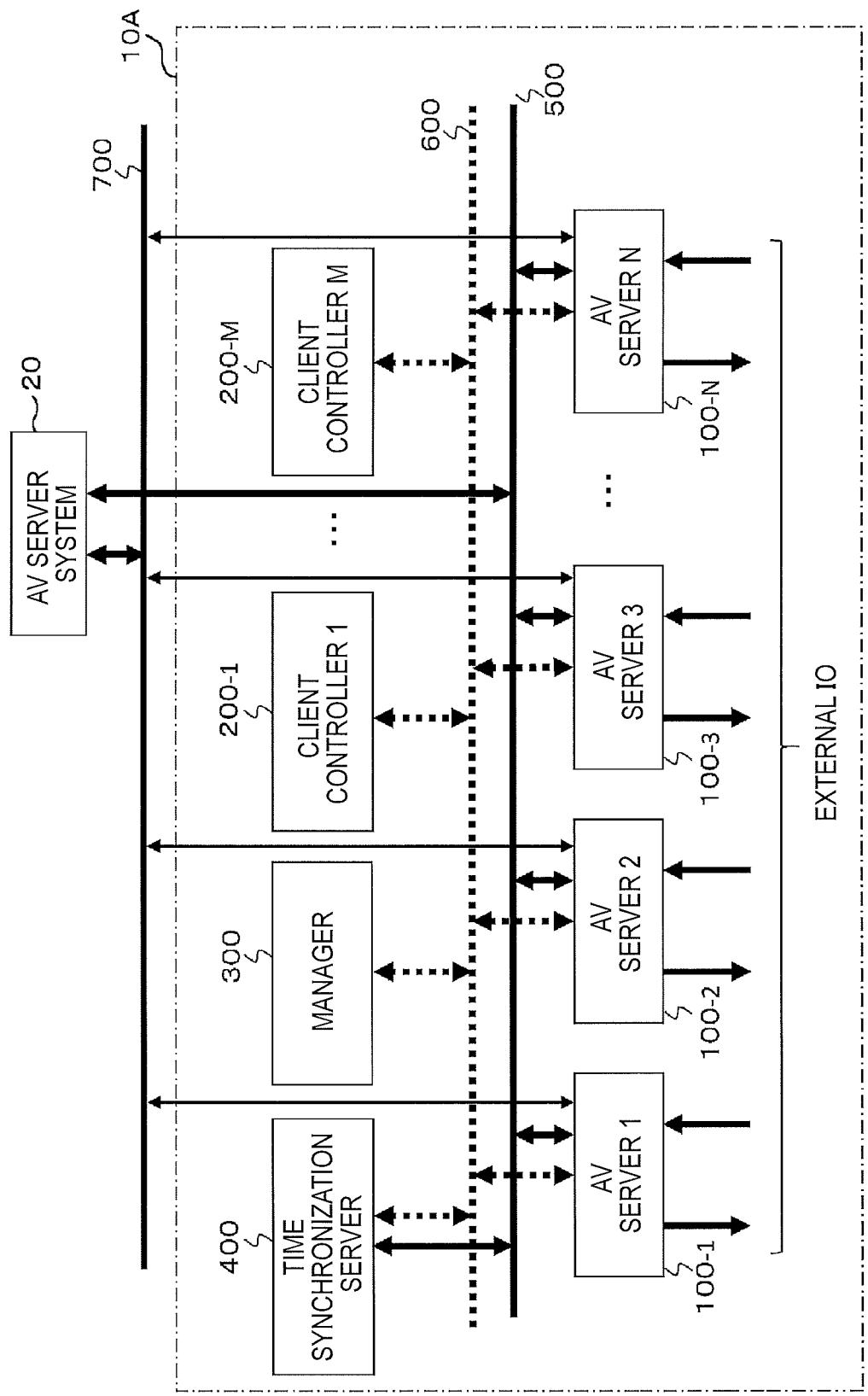
FIG. 13 is a diagram illustrating a configuration example of an AV server system as a second embodiment.

FIG. 13 illustrates a configuration example of an AV server system 10A as a second embodiment. In FIG. 13, the parts corresponding to FIG. 1 are denoted with the same reference signs, and their detailed description will be omitted as appropriate. Same as the AV server system 10 illustrated in FIG. 1, this AV server system 10A includes N (N is more than one) AV servers 100-1, 100-2, . . . , 100-N, M client controllers 200-1, 200-2, . . . , 200-M, a manager 300, and a time synchronization server 400.

The AV server system (a first AV server system) 10A is connected to another AV server system (a second AV server system) 20. That is, the AV server system 20 is connected to an external system network 700, and an inter-server network 500 of the AV server system 10A is connected to the AV server system 20.

In addition, AV servers 100-1, 100-2, . . . , 100-N of the AV server system 10A are connected to the external system network 700 as well as to the inter-server network 500. The AV servers 100-1, 100-2, . . . , 100-N of the AV server system 10A can transmit AV clip data to another AV server via the inter-server network 500, similarly to the AV server system 10 illustrated in FIG. 1.

In addition, the AV servers 100-1, 100-2, . . . , 100-N of the AV server system 10A can transmit AV clip data to each AV server of the AV server system 20 via the external system network 700. Transmission of AV clip data is asynchronously performed between the AV servers 100-1, 100-2, . . . , 100-N of the AV server system 10A and each AV server of the AV server system 20. In this case, for example, an asynchronous transfer based on an FTP file transfer protocol is performed.

Figure 14:
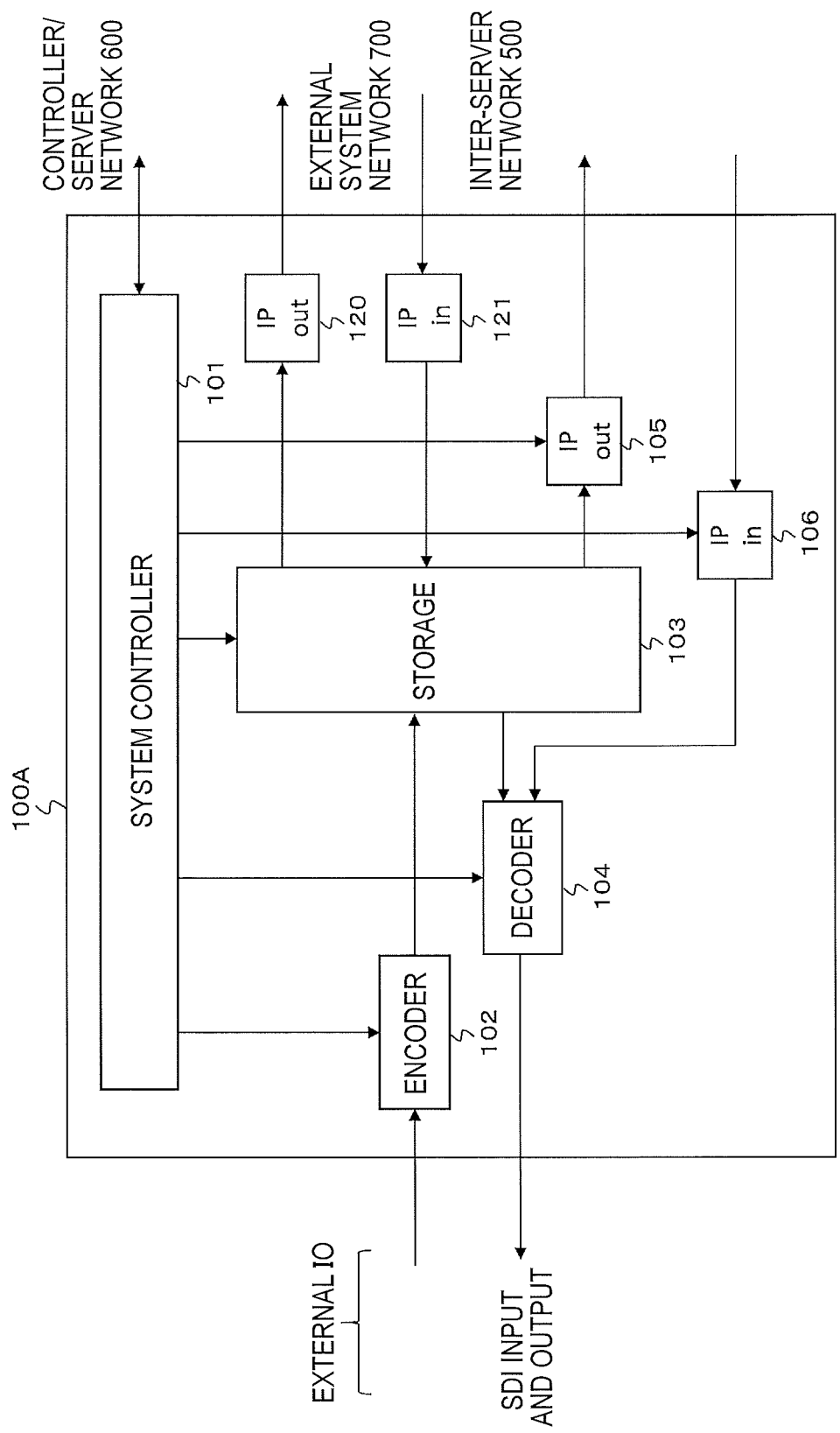
FIG. 14 is a block diagram illustrating a configuration example of an AV server.

FIG. 14 illustrates a configuration example of an AV server 100A that can be used as any of the AV servers 100-1, 100-2, . . . , 100-N of the AV server system 10A. In FIG. 14, the parts corresponding to FIG. 2 are denoted with the same reference signs, and their detailed description will be omitted as appropriate.

This AV server 100A includes a system controller 101, an encoder 102, a storage 103, a decoder 104, an IP output unit 105, an IP input unit 106, an IP output unit 120, and an IP input unit 121. The system controller 101 controls the operation of each unit of the AV server 100A. This system controller 101 is connected to the controller/server network 600.

The IP output unit 120 configures an IP output port for connecting to the external system network 700. The IP input unit 121 configures an IP input port for connecting to the external system network 700. The IP output unit 120 and the IP input unit 121 enable asynchronous transfer (transmission and reception) of AV clip data to and from each AV server of the AV server system 20.

Figure 15:
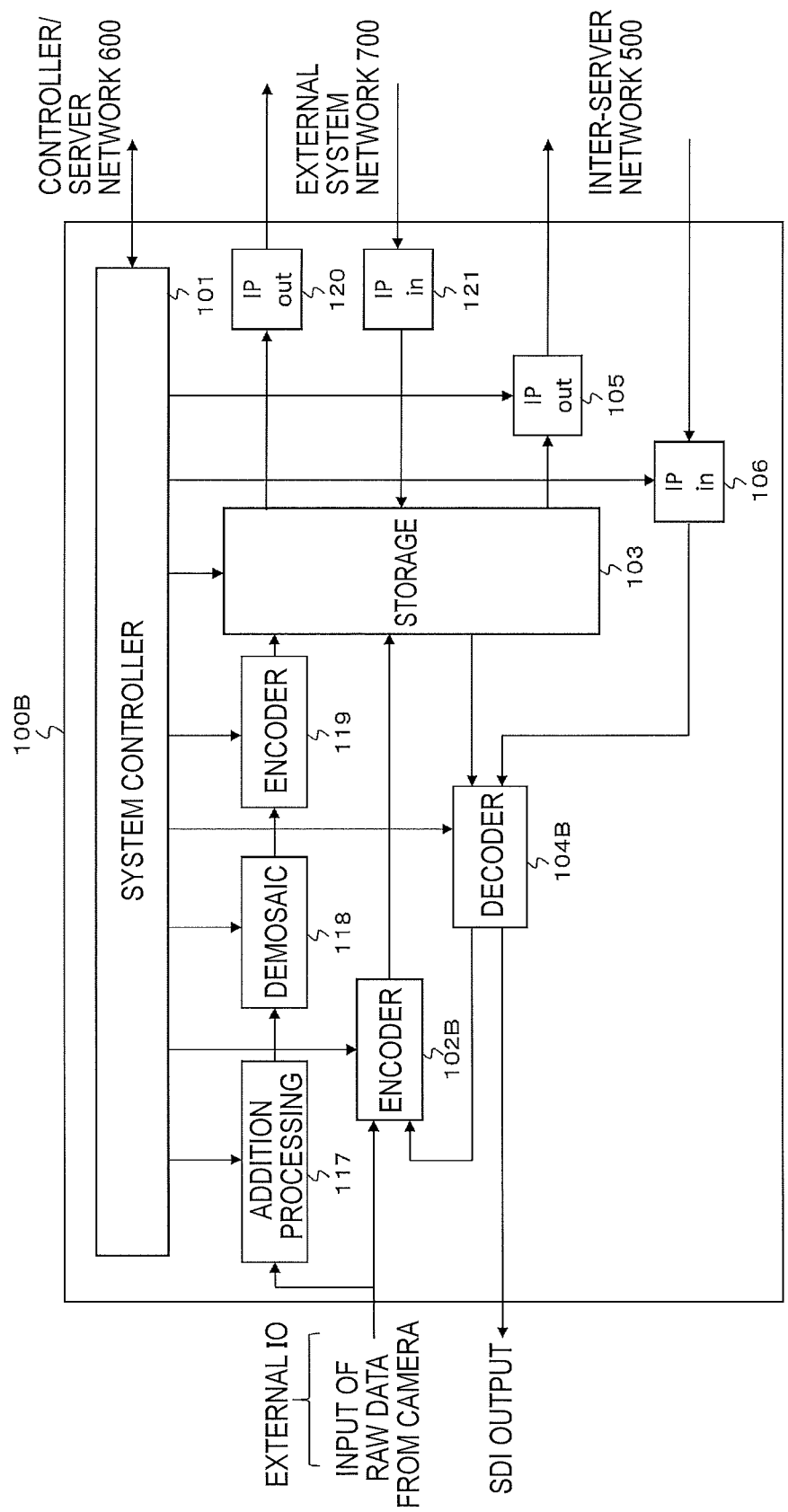
FIG. 15 is a block diagram illustrating a configuration example of an AV server to which raw data of a high frame rate is input from a single-chip camera.

The AV servers 100-1, 100-2, . . . , 100-N of the AV server system 10A also include at least an AV server 100B to which raw data of a high frame rate is input from a single-chip camera. FIG. 15 illustrates a configuration example of the AV server 100B In FIG. 15, the parts corresponding to FIG. 8 are denoted with the same reference signs, and their detailed description will be omitted as appropriate.

This AV server 100B includes a system controller 101, an encoder 102B, a storage 103, a decoder 104B, an IP output unit 105, an IP input unit 106, an IP output unit 120, and an IP input unit 121. In addition, the AV server 100B has an addition processing unit 117, a demosaic unit 118, and an encoder 119. The system controller 101 controls the operation of each unit of the AV server 100B. This system controller 101 is connected to the controller/server network 600.

The IP output unit 120 configures an IP output port for connecting to the external system network 700. The IP input unit 121 configures an IP input port for connecting to the external system network 700. The IP output unit 120 and the IP input unit 121 enable asynchronous transfer (transmission and reception) of AV clip data to and from each AV server of the AV server system 20.

The addition processing unit 117 adds every consecutive N frames to the raw data of the high frame rate of N times the speed input from a single-chip camera, and further the result is multiplied by 1/N in order to obtain the raw data of a normal frame rate of 1× speed. The demosaic unit 118 performs the demosaic process (development process) to the raw data of the normal frame rate obtained by the addition processing unit 117 to obtain video data (1× speed video data) of a normal frame rate. The encoder 119 performs an encoding process (compression encoding process) to the video data of the normal frame rate obtained by the demosaic unit 118 in order to obtain compressed video data of the normal frame rate (1× speed compressed video data), and this compressed video data is written and stored (recorded) in the storage 103 as compressed AV clip data.

The encoder 102B performs an encoding process (compression encoding process) on the raw data of the high frame rate of N times speed input from the single-chip camera to obtain compressed raw video data, adds paint information to the compressed raw data, and writes and stores (records) the compressed raw data in the storage 103 as compressed AV clip data. By recording the raw data input from the single-chip camera, in the storage 103 without performing the demosaic process as described above, the raw data of the high frame rate can be smoothly recorded in the storage 103, and the freedom degree of processing, such as gradation and coloring, can be ensured.

The decoder 104B generates uncompressed AV clip data by performing a decoding process to the compressed AV clip data read out from the storage 103 or input into the IP input unit 106 from another AV server, and outputs the uncompressed AV clip data to the external IO.

In addition, in a case in which video data of raw data of a high frame rate is transmitted to a predetermined AV server of the external AV server system 20, the decoder 104B obtains the video data (N times speed video data) of the high frame rate corresponding to the compressed raw data of the high frame rate written in the storage 103 as described above, and transfers the data to the encoder 102B.

In this case, the decoder 104B reads the compressed raw data of the high frame rate from the storage 103, performs a decoding process (compression decoding process) on the compressed raw data to obtain raw data of the high frame rate, performs the demosaic process on the raw data to obtain video data of the high frame rate, and then supplies the data to the encoder 102B. Note that, at the time of the demosaic process, the decoder 104B performs a process such as gamma correction, white balance adjustment, and the like using the pain information added to the compressed raw data.

In a case in which the video data of the raw data of the high frame rate is transmitted to a predetermined AV server of the external AV server system 20, the encoder 102B performs the encoding process (compression encoding process) on the video data (N times speed video data) of the high frame rate transferred from the decoder 104B as described above to obtain compressed video data of a high frame rate, and writes and stores (records) the compressed video data in the storage 103 as compressed AV clip data.

Figure 16:
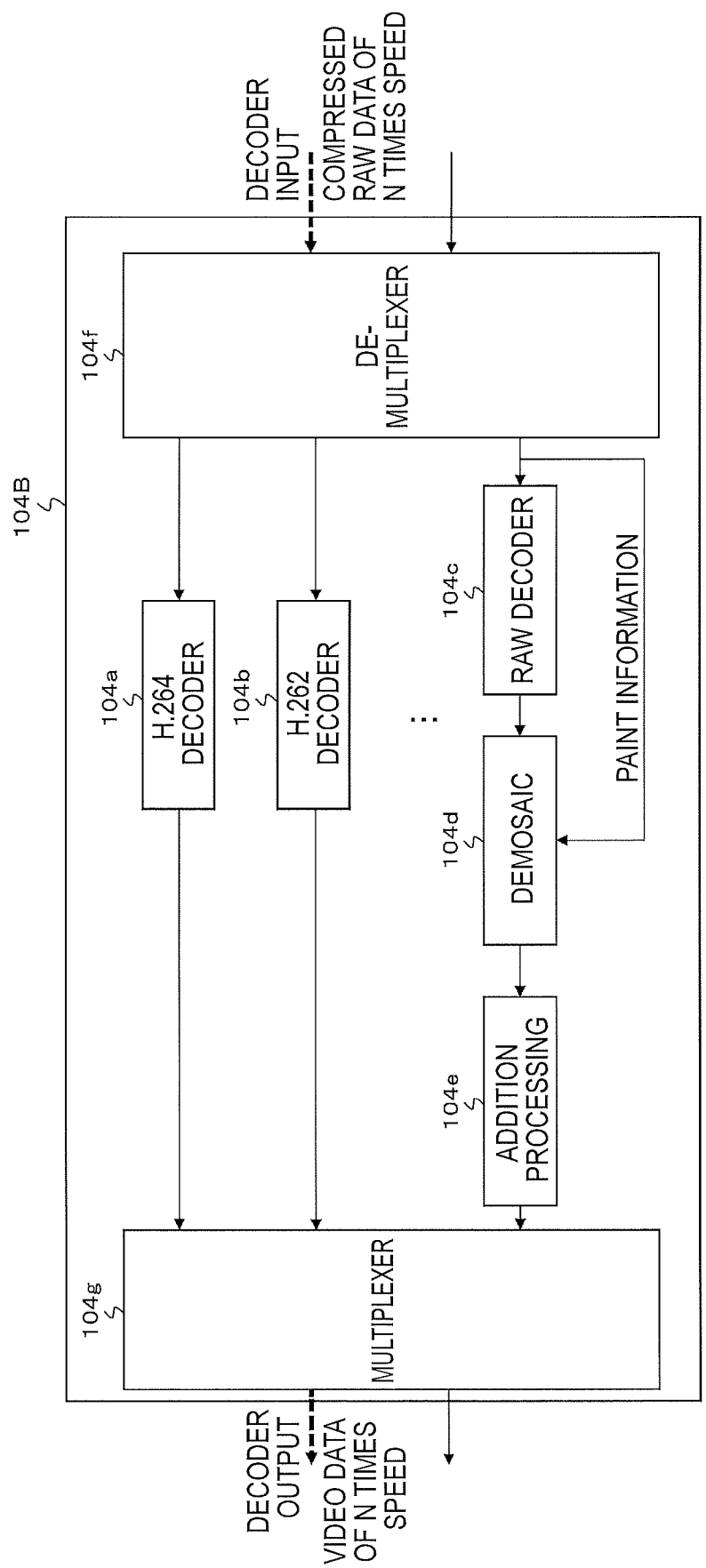
FIG. 16 is a block diagram illustrating a configuration example of a decoder.

FIG. 16 illustrates a configuration example of the decoder 104B. The decoder 104B includes a plurality of types of decoders such as an H.264 decoder 104a, an H.262 decoder 104b, and the like to enable decoding of various codecs. In addition, the decoder 104B includes a raw decoder 104c and a demosaic unit 104d, and can also decode compressed raw data of the high frame rate of N times the speed.

In addition, the decoder 104B includes an addition processing unit 104e that can add every consecutive k frames to video data of a high frame rate of N times the speed obtained by the demosaic unit 104d and multiply the result by 1/k. In this case, slow replay is enabled at various rates with N at the time of image capturing and k at the time of replay.

A utilized decoder is selected by a demultiplexer 104f and a multiplexer 104g. In a case in which video data of the raw data of the high frame rate is transmitted to a predetermined AV server of the external AV server system 20, a path of the raw decoder 104c and the demosaic unit 104d is selected in the decoder 104B with respect to the compressed raw data of the high frame rate of N times the speed (N times speed compressed raw data) read from the storage 103, and the video data of the high frame rate (N times speed video data) obtained by the demosaic unit is transferred to the encoder 102B without change.

Figure 17:
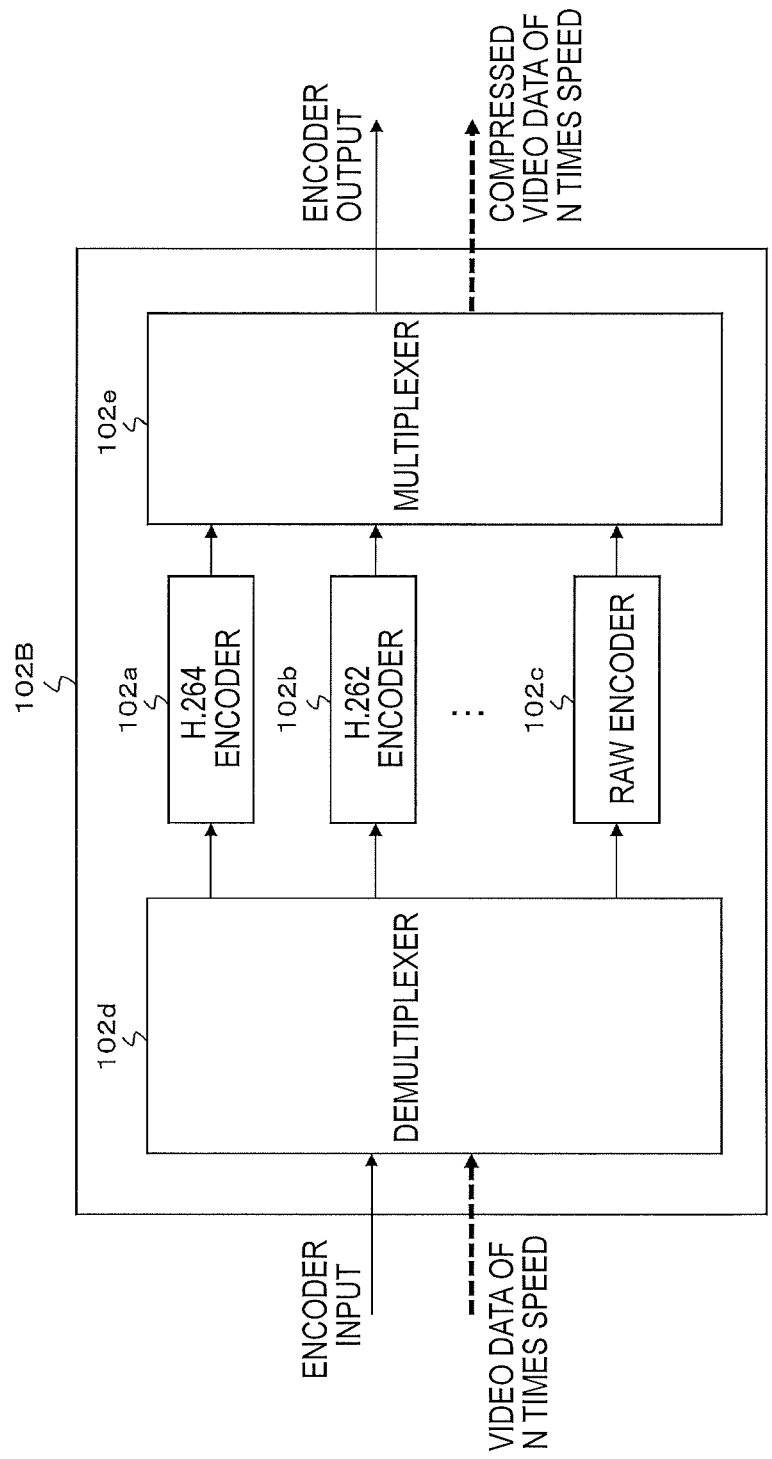
FIG. 17 is a block diagram illustrating a configuration example of an encoder.

FIG. 17 illustrates a configuration example of the encoder 102B. The encoder 102B includes a plurality of types of encoders such as an H.264 encoder 102a, an H.262 encoder 102b, and a raw encoder 102c to enable encoding of various codecs. A utilized encoder is selected by a demultiplexer 102d and a multiplexer 102e. The H.264 encoder 102a, the H.264 encoder 102b, or the like is selected with respect to the video data of the high frame rate (N times speed video data) transferred from the decoder 104B, and compressed video data of the high frame rate (N times speed compressed video data) obtained by the encoder is transferred to the storage 103.

Returning to the description with reference to FIG. 15, the IP output unit 120 configures an IP output port for connecting to the external system network 700. The IP input unit 121 configures an IP input port for connecting to the external system network 700. The IP output unit 120 and the IP input unit 121 enable asynchronous transfer (transmission and reception) of AV clip data to and from each AV server of the AV server system 20.

In the case in which the video data of the raw data of a high frame rate is transferred to a predetermined AV server of the external AV server system 20, the IP output unit 120 reads the compressed video data of the high frame rate (N times speed compressed video data) from the storage 103 and transfers the data to the predetermined AV server of the AV server system 20 via the external system network 700.

The case in which the video data of the raw data of the high frame rate is transferred to the predetermined AV server of the external AV server system 20 in the AV server 100B illustrated in FIG. 15 will be further described.

In order to link to the predetermined AV server of the AV server system 20 outside of the system for quick operation of slow motion replay during a live operation, the AV server 100B illustrated in FIG. 15 performs operations of reading a range defined with an in (IN) point and an out (OUT) point from the compressed raw data of the high frame rate (N times speed compressed raw data) written in the storage 103, processing the range, and transmitting compressed video data (N times speed compressed video data) corresponding to the range to the predetermined AV server of the AV server system 20 in a background while the AV server system 10A is running.

That is, while processing the raw data of the high frame rate input from the single-chip camera and performing a process of writing compressed AV clip data corresponding to 1× speed compressed video data and compressed AV clip data corresponding to the N times speed compressed raw data in the storage 103, the AV server 100B reads the compressed AV clip data in the range defined with the IN point and the OUT point, performs a decoding process and a demosaic process with the decoder 104B, further performs an encoding process with the encoder 102B, and transmits the result from the IP output unit 120 to the predetermined AV server of the AV server system 20.

In addition, during processing of the raw data of the high frame rate input from the single-chip camera, while the AV server 100B transmits the compressed AV clip data corresponding to the 1× speed compressed video data to another AV server included in the AV server system 10A, the AV server 100B simultaneously reads the N times speed compressed raw data from the storage 103 in the range defined with the IN point and the OUT point, performs a decoding process and a demosaic process with the decoder 104B, further performs an encoding process with the encoder 102B, and transmits the result from the IP output unit 120 to the predetermined AV server of the AV server system 20.

There are also cases in which transmission of the compressed video data corresponding to the raw data of the N times speed frame rate (N times speed compressed video data) to the predetermined AV server of the AV server system 20 described above overlaps a slow motion replay request made to an internal AV server of the AV server system 10A.

In that case, the AV server 100B performs reading of the N times speed compressed raw data based on an editing point requested by the storage 103 in addition to the transmission operation of the compressed video data (N times speed compressed video data) to the predetermined AV server of the AV server system 20 described above, and then transmits the result from the IP output unit 105 to the internal VA server of the AV server system 10A.

Here, the editing point of the replay request to the predetermined AV server of the AV server system 20, which is an external system, may be set to be independent and different from an editing point of a replay request to the internal AV server of the AV server system 10A, and the same replay request as that to the internal AV server of the AV server system 10A may be automatically transferred to the AV server system 20, which is an external system.

In addition, in the case in which the same replay request as that to the internal AV server of the AV server system 10A is automatically transferred to the predetermined AV server of the AV server system 20, the IN point and the OUT point may be moved by a predetermined number of frames so that editing is possible to some degree in the predetermined AV server of the AV server system 20.

The slow motion replay request can be performed within the AV server system 10A and also can be made from the AV server system 20, which is an external system. The replay request from the AV server system 20 is made with respect to the client controller included in the AV server system 10A. In this case, since the AV server system 20 performs designation of an editing point and a transfer destination AV server with respect to the client controller included in the AV server system 10A and the corresponding client controller performs designation within the system, the replay request from the AV server system 20 can be made.

Figure 18:
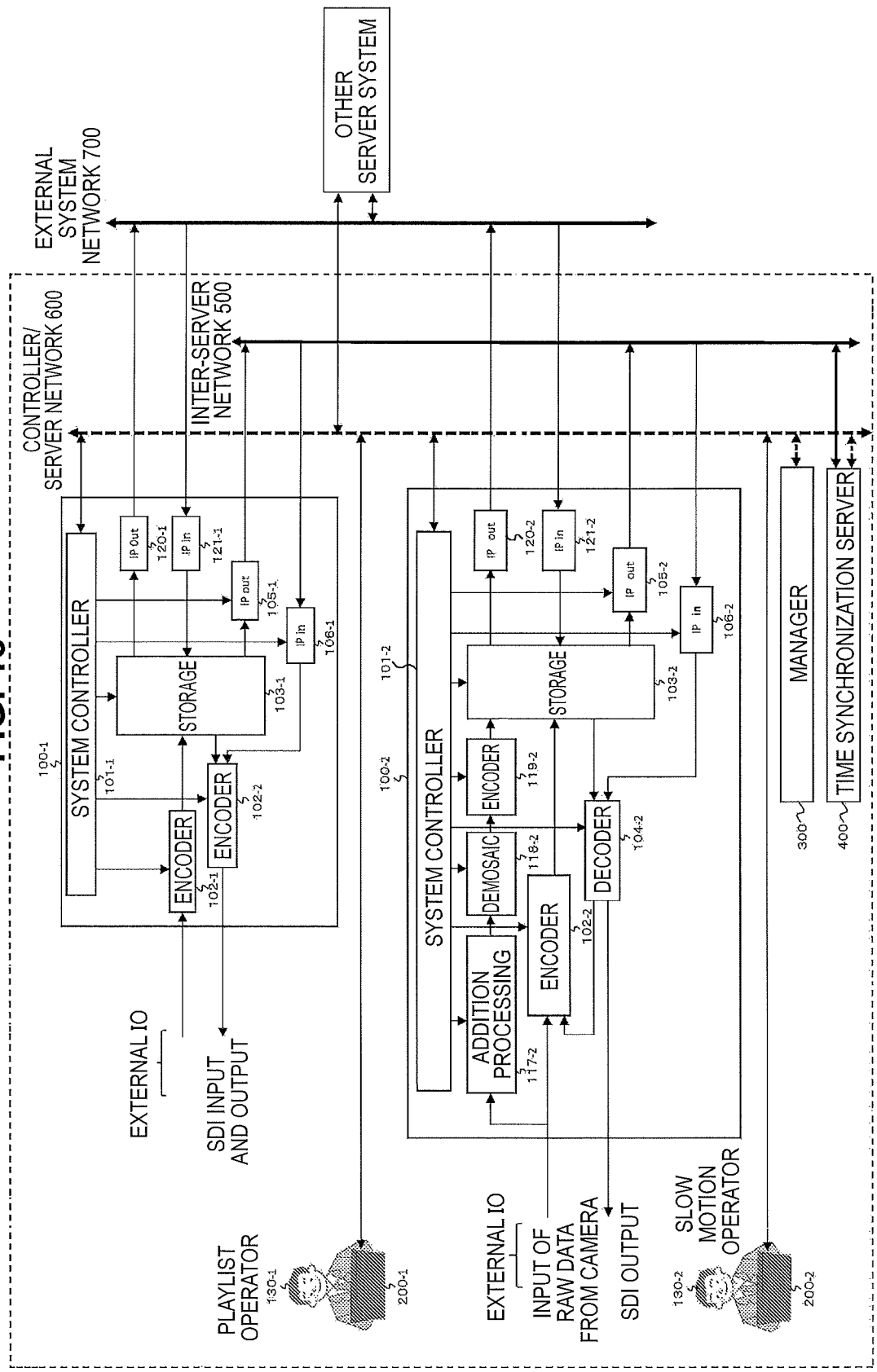
FIG. 18 is a diagram for describing an operation of transmitting AV clip data to a predetermined AV server of an external system in a background.

An operation in which, while the AV server 100-2 (which corresponds to the AV server 100B illustrated in FIG. 15) shares a file with the AV server 100-1 (which corresponds to the AV server 100A illustrated in FIG. 14), the servers transfer AV clip data to a predetermined AV server of the AV server system 20, which is an external system, in a background will be described with reference to FIG. 18.

Various AV clip data is input to the AV server 100-1 from SDI input/output, compressed in an encoder 102-1, and recorded in a storage 103-1, and information relevant to the recorded compressed AV clip data is transferred to the manager 300. Compressed AV clip data is also transferred from the external system network 700 in asynchronous transfer such as FTP, and recorded in the storage 103-1, and information relevant to the recorded compressed AV clip data is transferred to the manager 300.

Raw data of a high frame rate captured at a high speed is input to the AV server 100-2 from a high-frame-rate (HFR) camera, compressed by an encoder 102-2, and recorded in a storage 103-2 as compressed AV clip data corresponding to the raw data, and information relevant to the recorded compressed AV clip data is transferred to the manager 300. Compressed AV clip data is also transferred from the external system network 700 in asynchronous transfer such as FTP, and recorded in the storage 103-2, and information relevant to the recorded compressed AV clip data is transferred to the manager 300.

The slow motion operator 130-2 determines an AV clip that is subject to slow motion replay from the compressed AV clip data captured by the HFR camera. That is, certain compressed AV clip data recorded in the storage 103-2 is designated, and an IN point and an OUT point indicating the start and the end of a part of the AV clip data are determined. The information is transferred to the manager 300.

The playlist operator 130-1 creates an output playlist from the SDI input/output of the AV server 100-1. In this example, the slow motion operator 130-2 concentrates on setting AV clip data of slow motion replay, and the playlist operator 130-1 receives information of the AV clip data recorded in the storages 103-1 and 103-2 of the AV servers 100-1 and 100-2 from the manager 300, creates a playlist, and causes the playlist to be output from the SDI input/output of the AV server 100-1.

Although material clips of the playlist are already in the storages 103-1 and 103-2, clips generated from HFR capturing by the HFR camera are added to the storage 103-2 at every moment in this example.

The raw data of the high frame rate is input from the HFR camera to the encoder 102-2. The input raw data of the high frame rate is compressed by a raw encoder included in the encoder 102-2 and recorded as compressed AV clip data corresponding to the compressed raw data in the storage 103-2.

At the same time, the raw data of a high frame rate from the HFR camera is also input to an addition processing unit 117-2, undergoes addition/conversion into 1× speed raw data, developed to baseband video data in a demosaic unit 118-2, compressed again by an encoder 119-2, and recorded in the storage 103-2 as compressed AV clip data corresponding to compressed video data of a normal frame rate (1× speed compressed video). Here, the addition/conversion into 1× speed is to add data of every consecutive N frames to raw data captured at a high frame rate of, for example, N times speed and divide the data by N to convert the data into data of the 1× speed. It does not matter to set to 1× speed in a thinning process of leaving only one frame for every N frames.

In a case of sports broadcasting, for example, several cameras capture the game from various positions. Although only one camera is connected to one AV server 100-2 in FIG. 18, a plurality of cameras can be connected thereto if the AV server has a plurality of inputs, and since a plurality of AV servers can be connected in the AV server system 10A, many cameras can be connected to the AV server system 10A. Since the AV server 100-1 supports only cameras of 1× speed, 1x speed compressed AV clip data is recorded in the storage 103-1, and since the AV server 100-2 supports HFR cameras, compressed AV clip data corresponding to raw data of an HFR and compressed clip data corresponding to raw data of the 1× speed are recorded in the storage 103-2.

The playlist operator 130-1 performs creation by connecting 1× speed clips obtained by capturing the playlist from various positions, inserts compressed AV clip data corresponding to the raw data of the HFR set by the slow motion operator 130-2 at necessary places of the playlist, and thereby creates the playlist for outputting slow motion replay from the SDI input/output.

This operation can be executed in real time. While the playlist is created on the above-described playlist creation screen illustrated in FIG. 10, the playlist can be executed. Although ABCB' are connected to clips in FIG. 10, a previous playlist may be set from B' while SDI output is performed in the aforementioned playlist.

A clip A of FIG. 10 is assumed to be, for example, a 1× speed video of an HFR camera. It is assumed that, due to a file sharing operation, a state of output from the SDI input/output of the AV server 100-1 continues with a delay of several frames from image capturing. Thus, if an AV clip B from HFR capturing set by the slow motion operator 130-2 is selected and added to the playlist, and an AV clip C from another 1× speed camera is added to the playlist before the AV clip B ends, while a real time video is output with the delay of several frames for the file sharing operation, a slow motion video can be inserted in the middle of the aforementioned video.

As soon as the slow motion operator 130-2 sets the AV clip B for replay, information thereof is reflected to the client controller 200-1 operated by the playlist operator 130-1 via the manager 300, and thus the playlist operator 130-1 can use the AV clip B.

In order to make it possible to use AV clips continuously created as described above also in another AV server system 20 which is an external system immediately, it is necessary to execute a transfer operation of compressed AV clip recorded in the storages of the AV servers of the AV server system 10A to a predetermined AV server of the AV server system 20 in a background of an in-system operation of the above-described the AV server system 10A.

In a case of compressed AV clip data corresponding to video data, for example, compressed AV clip data recorded in the storage 103-2 of the AV server 100-2 may be subject to an FTP transfer to the predetermined AV server of the AV server system 20 from the IP output unit 120-2 connected to the external system network 700.

Raw data generally has different formats for each camera. Thus, it is not possible to perform demosaic in another AV server system at all times. Thus, the path of the storage 103-2→the decoder 104-2→the encoder 102-2 is necessary.

Figure 19:
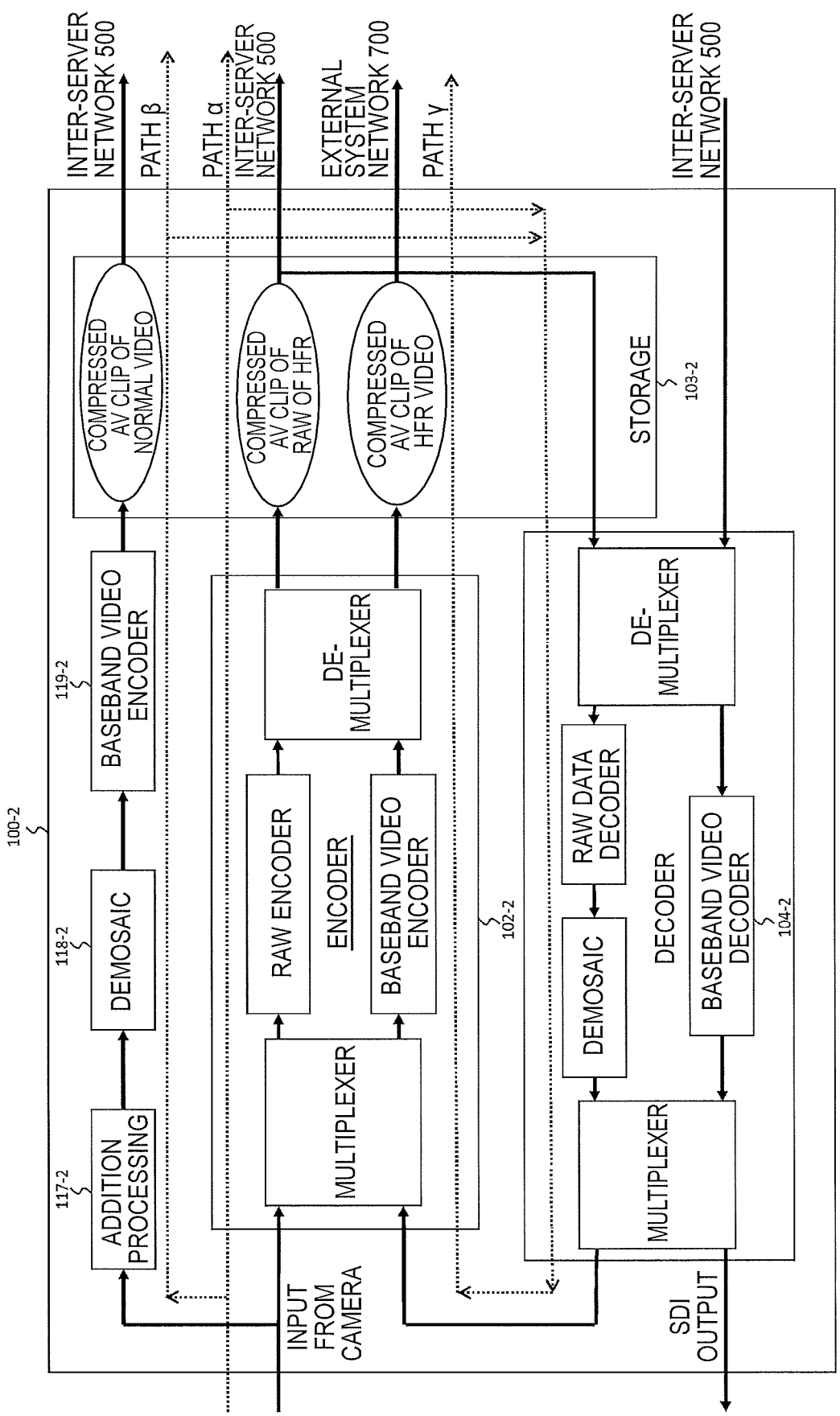
FIG. 19 is a diagram for describing a flow of data to be processed in a background.

A flow of data to be processed in a background will be described with reference to FIG. 19. FIG. 19 illustrates only the data path of the AV server 100-2 of FIG. 18, the encoder 102-2, and the decoder 104-2 in detail by replacing the elements to have the structure of FIG. 17 and FIG. 16 to show that a data transfer is possible to the outside of the system in the background of a data transfer of the file sharing operation.

FIG. 19 will be described below. It is not a problem to transfer compressed AV clip data corresponding to a normal video recorded in the storage 103-2 to another AV server system with an FTP without change as long as a general compression method for baseband video is used, regardless of whether the compressed AV clip data is 1× speed data or high-frame-rate data. Here, only a case in which an input to the AV server 100-2 is raw data will be described. Meanwhile, the AV server 100-2 can even support normal video that is not raw data input from a camera.

A raw data input from the HFR camera is recorded in the storage 103-2 as compressed AV clip data corresponding to raw data of the high frame rate by the raw encoder included in the encoder 102-2 (path α). At the same time, compressed AV clip data corresponding to normal 1× speed video data is recorded in the storage 103-2 by the addition processing unit 117-2, the demosaic unit 118-2, and the encoder (baseband video encode) 119-2 (a path β), and in a transfer for file sharing, both pieces of data are transferred to another AV server included in the AV server system 10A via the inter-server network 500 as they are.

While the operation is executed, the compressed AV clip data corresponding to the raw data of the HFR or 1× speed is decompressed by the raw decoder of the decoder 104-2, developed to baseband video data by the demosaic unit, converted into compressed AV clip data corresponding to normal video data by the encoder (baseband video encoder) of the encoder 102-2, and then transferred to another system using the FTP on the external system network 700 (a path γ). Since the path α, the path β, and the path γ do not overlap, processes on the path γ can be operated in the background.

As described above, in the AV server system 10A illustrated in FIG. 13, a plurality of AV servers 100 are connected by the IP network, and the number of IO ports and the storage amount are increased easily. Also, the inter-server network 500 between the AV servers 100 is configured with general-purpose IP switches, which are not specialized for AV system products, and thus not only acquisition is easy in future, but also the performance is expected to be improved, and a connection that can meet more advanced replay request is enabled.

In addition, in the AV server system 10A illustrated in FIG. 13, the AV server 100B (see FIG. 15) decodes compression encoded data of the raw data written in the storage 103, then performs a demosaic process thereon, thereby obtains video data, and then transmits the compression encoded data of the video data to the AV server system 20 serving as an external system. Thus, the AV server system 20 can easily use the video data of the raw data of the high frame rate input from the single-chip camera even if it is not possible to handle raw data.

Note that, in the above description, the example in which the compressed video data corresponding to the raw data from the storage 103 is read and transmitted from the AV server 100B (see FIG. 15) to the AV server system 20 serving as an external system has been introduced. However, it is also possible to read the compressed raw data from the storage 103 and transmit the compressed raw data to the AV server system 20 serving as an external system selectively. In this case, since the compression encoded data of the raw data is transmitted to the AV server system 20, in the case in which the AV server system 20 can handle the raw data, image processing using the raw data can be performed.

3. Variant Example

Although the above embodiment has illustrated an example in which the inter-server network 500 and the controller/server network 600 are independent, V-LAN may be formed as the physically same IP network. Also, the network may be physically the same as the IP network outside the system, as long as the independence by V-LAN is maintained.

Also, the above embodiment has illustrated an example in which each of the time synchronization server 400, the manager 300, and the client controllers 200-1, 200-2, . . . , 200-M is provided independently. However, these do not need to exist physically independently, and there may be other functions in the AV servers 100-1, 100-2, . . . , 100-N. For example, the individual AV servers may have a client controller function, and one of the AV servers may have a manager function, and similarly one of the AV servers may serve as a time synchronization server.

Also, the above embodiment has illustrated an example in which there is one manager 300. However, it may be such that a plurality of managers are connected, and normally only one of them is in operation while the others are reserved as backup, and the information sent to the one manager in operation is also sent to the other backup managers to always update the recognized information, and thereby one of the backup managers operates as a new manager when the manager in operation is down.

Additionally, the present technology may also be configured as below.

(1)

An AV server including:

a first processing unit configured to obtain first AV clip data by performing a compression encoding process on raw data of a high frame rate input from a single-chip camera and write the first AV clip data in a storage;

a second processing unit configured to obtain the raw data of the high frame rate by reading the first AV clip data from the storage and performing a compression decoding process on the first AV clip data, obtain video data of a high frame rate by performing a demosaic process on the raw data of the high frame rate, obtain second AV clip data by performing a compression encoding process on the video data of the high frame rate, and write the second AV clip data in the storage; and a third processing unit configured to read the second AV clip data from the storage and transmit the second AV clip data to a second AV server system that is different from a first AV server system in which the AV server itself is included.

(2)

The AV server according to (1), in which the process performed by the first processing unit and the processes performed by the second processing unit and the third processing unit are performed in parallel.

(3)

The AV server according to (1) or (2), in which the third processing unit asynchronously transmits the second AV clip data to the second AV server system.

(4)

The AV server according to (3), in which the second processing unit transmits the AV clip data to the second AV server system on a basis of an FTP file transfer protocol.

(5)

The AV server according to any of (1) to (4), in which the second processing unit reads and processes a range defined with an IN point and an OUT point from the first AV clip data written in the storage.

(6)

The AV server according to (5), in which the IN point and the OUT point are instructed by a client controller included in the first AV server system or instructed by the second AV server system via the client controller included in the first AV server system.

(7)

The AV server according to (5), in which, as the IN point and the OUT point, the second processing unit uses an IN point and an OUT point of an output request of the first AV clip data within the first AV server system.

(8)

The AV server according to (5), in which, as the IN point and the OUT point, the second processing unit uses an IN point and an OUT point which are obtained by shifting an IN point and an OUT point of an output request of the first AV clip data within the first AV server system by a predetermined amount such that a reading range is widened.

(9)

The AV server according to any of (1) to (8), in which the third processing unit reads the first AV clip data from the storage and transmits the first AV clip data to the second AV server system, selectively.

(10)

An AV server system including:

a plurality of AV servers, each of which is configured to have an Internet Protocol (IP) input-output port for connecting to another AV server that is independent from an input-output port to an outside of the system;

a client controller configured to control the plurality of AV servers;

a manager configured to store information relevant to AV clip data recorded in the plurality of AV servers and AV clip data input to the plurality of AV servers; and a frame synchronization unit configured to perform frame synchronization between the plurality of AV servers, in which the plurality of AV servers include at least a predetermined AV server to which raw data of a high frame rate is input from a single-chip camera, and the predetermined AV server includes a first processing unit configured to obtain first AV clip data by performing a compression encoding process on the raw data of the high frame rate and write the first AV clip data in a storage;

a second processing unit configured to obtain the raw data of the high frame rate by reading the first AV clip data from the storage and performing a compression decoding process on the first AV clip data, obtain video data of a high frame rate by performing a demosaic process on the raw data of the high frame rate, obtain second AV clip data by performing a compression encoding process on the video data of the high frame rate, and write the second AV clip data in the storage; and a third processing unit configured to read the second AV clip data from the storage and transmit the second AV clip data to a second AV server system that is different from a first AV server system in which the predetermined AV server itself is included.

REFERENCE SIGNS LIST 10, 10A, 20 AV server system
100, 100A, 100B, 100-1, 100-2, . . . 100-N AV server
101 system controller
102, 102B encoder
103 storage
104, 104B, 104a, 104b decoder
105 IP output unit (IP output port)
106, 106a, 106b IP input unit (IP input port)
107 frame buffer
108 bank
109 SDI formatter
110 effector
117 addition processing unit
118 demosaic unit
119 encoder
120 IP output unit (IP output port)
121 IP input unit (IP input port)
200, 200-1, 200-2, . . . , 200-M client controller
300 manager
400 time synchronization server
500 inter-server network 600 controller/server network
700 external system network

The invention claimed is:

1. An AV server of a first AV server system, the AV server comprising:
   circuitry configured to:
   support a plurality of types of decoders for decoding a plurality of different codecs;
   perform a first compression encoding process on raw data of a high frame rate inputted from a single-chip camera, obtain first AV clip data from the raw data that is compression encoding processed, and write the first AV clip data in a storage;
   read the first AV clip data from the storage and perform a compression decoding process on the first AV clip data to obtain the raw data of the high frame rate, perform a demosaic process on the raw data of the high frame rate obtained from the compression decoding process to obtain video data of the high frame rate, delay outputting the video data of the high frame rate from the demosaic process by a constant value that is associated with the types of decoders, after the delay, perform a second compression encoding process on the video data of the high frame rate to obtain second AV clip data, and write the second AV clip data in the storage; and
   read the second AV clip data from the storage and transmit the second AV clip data to a second AV server system that is different from the first AV server system.

2. The AV server according to claim 1,
   wherein the circuitry is further configured to perform the first compression encoding process, the compression decoding process, and transmit the second AV clip data in parallel.

3. The AV server according to claim 1,
   wherein the circuitry is further configured to asynchronously transmit the second AV clip data to the second AV server system.

4. The AV server according to claim 3,
   wherein the circuitry is further configured to transmit the second AV clip data to the second AV server system based on an FTP file transfer protocol.

5. The AV server according to claim 1,
   wherein the circuitry is further configured to read and process a range defined with an IN point and an OUT point from the first AV clip data written in the storage.

6. The AV server according to claim 5,
   wherein the IN point and the OUT point are instructed by a client controller included in the first AV server system or instructed by the second AV server system via the client controller included in the first AV server system.

7. The AV server according to claim 5,
   wherein, as the IN point and the OUT point, the circuitry is further configured to use an IN point and an OUT point of an output request of the first AV clip data within the first AV server system.

8. The AV server according to claim 5,
   wherein, as the IN point and the OUT point, the circuitry is further configured to use an IN point and an OUT point which are obtained by shifting an IN point and an OUT point of an output request of the first AV clip data within the first AV server system by a predetermined amount such that a reading range is widened.

9. The AV server according to claim 1,
   wherein the circuitry is further configured to read the first AV clip data from the storage and transmit the first AV clip data to the second AV server system, selectively.

10. An AV server system comprising:
    a plurality of AV servers, each of which is configured to have an Internet Protocol (IP) input-output port for connecting to another AV server that is independent from an input-output port to an outside of the AV server system; and
    system circuitry configured to:
    control the plurality of AV servers;
    store information relevant to AV clip data recorded in the plurality of AV servers and AV clip data input to the plurality of AV servers; and
    perform frame synchronization between the plurality of AV servers,
    wherein the plurality of AV servers include at least a predetermined AV server to which raw data of a high frame rate is inputted from a single-chip camera, and
    the predetermined AV server of a first AV server system, the predetermined AV server including circuitry configured to:
    support a plurality of types of decoders for decoding a plurality of different codecs;
    perform a first compression encoding process on the raw data of the high frame rate, obtain first AV clip data from the raw data that is compression encoding processed, and write the first AV clip data in a storage;
    read the first AV clip data from the storage and perform a compression decoding process on the first AV clip data to obtain the raw data of the high frame rate, perform a demosaic process on the raw data of the high frame rate obtained from the compression decoding process to obtain video data of the high frame rate, delay outputting the video data of the high frame rate from the demosaic process by a constant value that is associated with the types of decoders, after the delay, perform a second compression encoding process on the video data of the high frame rate to obtain second AV clip data, and write the second AV clip data in the storage; and
    read the second AV clip data from the storage and transmit the second AV clip data to a second AV server system that is different from the first AV server system.

* * * * *